US012795593B2

(12) United States Patent
Lee et al.

(10) Patent No.: US 12,795,593 B2
(45) Date of Patent: Nov. 10, 2026

(54) TRANSMITTING AND RECEIVING SIGNALS IN WIRELESS COMMUNICATION SYSTEM, AND APPARATUS SUPPORTING SAME

(71) Applicant: LG ELECTRONICS INC., Seoul (KR)

(72) Inventors: Jeongsu Lee, Seoul (KR); Haewook Park, Seoul (KR); Kijun Kim, Seoul (KR); Hyunsoo Ko, Seoul (KR); Jiwon Kang, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 145 days.

(21) Appl. No.: 18/857,740

(22) PCT Filed: Nov. 30, 2022

(86) PCT No.: PCT/KR2022/019202
§ 371 (c)(1),
(2) Date: Oct. 17, 2024

(87) PCT Pub. No.: WO2023/204373
PCT Pub. Date: Oct. 26, 2023

(65) Prior Publication Data

US 2026/0019981 A1 Jan. 15, 2026

(30) Foreign Application Priority Data

Apr. 19, 2022 (KR) ........................ 10-2022-0048358

(51) Int. Cl.
*H04W 64/00* (2009.01)
*H04W 60/04* (2009.01)
*H04W 60/06* (2009.01)

(52) U.S. Cl.
CPC ........... *H04W 64/00* (2013.01); *H04W 60/04* (2013.01); *H04W 60/06* (2013.01)

(58) Field of Classification Search
CPC ...... H04W 64/00; H04W 60/04; H04W 60/06
(Continued)

(56) References Cited

U.S. PATENT DOCUMENTS

2022/0116904 A1* 4/2022 Fakoorian ......... H04W 28/0975
2023/0127908 A1* 4/2023 Berggren .............. G01S 5/0236 455/456.1

(Continued)

FOREIGN PATENT DOCUMENTS

EP 4513995 A1 * 2/2025 ............ H04W 60/06
KR 10-2021-0116629 A 9/2021
KR 20250003789 A * 1/2025 ............ H04W 60/06

OTHER PUBLICATIONS

InterDigital Inc. "Discussion on supporting Positioning Reference Units," 3GPP RAN WG2 Meeting #116bis-e, R2-2201191, 4 pages, Jan. 2022.

(Continued)

*Primary Examiner* — Anthony Mejia
(74) *Attorney, Agent, or Firm* — BRYAN CAVE LEIGHTON PAISNER LLP

(57) ABSTRACT

An embodiment relates to a next-generation wireless communication system for supporting a higher data transmission rate and the like than a 4th generation (4G) wireless communication system. According to an embodiment, a method for transmitting and receiving signals in a wireless communication system and an apparatus supporting same may be provided, and other embodiments may be provided.

12 Claims, 25 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2023/0328686 | A1* | 10/2023 | Edge | G01S 5/0072 455/456.1 |
| 2025/0358784 | A1* | 11/2025 | Edge | G01S 5/0072 |
| 2026/0019981 | A1* | 1/2026 | Lee | G01S 5/06 |

OTHER PUBLICATIONS

Qualcomm Incorporated, "Signalling and Procedures for Supporting Positioning Reference Units," 3GPP TSG-RAN WG3 Meeting #113-e, R3-213399, 16 pages, Aug. 2021.

Huawei, HiSilicon "Solution for KI#7: Support of Positioning Reference Units and Reference UEs," 3GPP TSG-WG SA2 Meeting #150E e-meeting, S2-2203305, 11 pages, Apr. 2022.

Lenovo, Motorola Mobility "Tx/Rx timing error mitigation Maintenance Issues," 3GPP TSG RAN WG1#108-e, R1-2202370, Mar. 2022, 5 pages.

Huawei, HiSilicon "Discussion on PRU," 3GPP TSG-RAN WG2, R2-211017, Meeting #116-e, 4 pages, Nov. 2021.

Qualcomm Incorporated "Remaining issues for Positioning Reference Units," 3GPP TSG-RAN WG2 Meeting #116-e, R2-2110826, 4 pages Nov. 2021.

Lenovo, Motorola Mobility "Support of Positioning Reference Units," 3GPP TSG RAN WG2 Meeting#116bis-e, R2-2200994, 5 pages, Jan. 2022.

* cited by examiner (a)

(b)

TRANSMITTING AND RECEIVING SIGNALS IN WIRELESS COMMUNICATION SYSTEM, AND APPARATUS SUPPORTING SAME

CROSS-REFERENCE TO RELATED APPLICATIONS

This application is a National Phase application under 35 U.S.C. 371 of International Application No. PCT/KR2022/019202, filed on Nov. 30, 2022, which claims the benefit of Korean Application No. 10-2022-0048358, filed on Apr. 19, 2022, the contents of which are incorporated by reference herein in their entirety.

TECHNICAL FIELD

One embodiment relates to a wireless communication system.

BACKGROUND

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

SUMMARY

One embodiment can provide a method for transmitting and receiving a signal in a wireless communication system and a device supporting the same.

To achieve these objects and other advantages and in accordance with the purpose of the disclosure, as embodied and broadly described herein, there is provided a method and apparatus for transmitting and receiving a signal in a wireless communication system.

One embodiment may provide a method of transmitting and receiving a signal in a wireless communication system and a device for supporting the same.

One embodiment may provide a method performed by a user equipment (UE) in a wireless communication system.

According to an embodiment, the method may include receiving a message including assistance data for positioning via long term evolution positioning protocol (LPP).

According to an embodiment, the method may include obtaining the assistance data based on the message.

According to an embodiment, based on the UE being determined to be a positioning reference unit (PRU) within a specific first time duration in a time domain, a registration message related to registering the UE as the PRU may be transmitted via the LPP.

According to an embodiment, based on expiration of the specific first time duration, the UE may transmit a de-registration message related to de-registration from the PRU through the LPP.

According to an embodiment, the registration message may include information related to a start point of the specific first time duration.

According to an embodiment, a time offset may be configured between the start point of the specific first time duration and a time at which the registration message is transmitted.

According to an embodiment, information about the time offset may be provided in the assistance data.

According to an embodiment, based on the UE satisfying at least one of one or more predefined conditions, the UE may be determined as the PRU.

According to an embodiment, the one or more predefined conditions may include one or more of a first condition related to a position change amount of the UE being less than or equal to a first threshold within a second time duration different from the first time duration, or a second condition related to an average position change amount of the UE being less than or equal to a second threshold within a plurality of third time durations different from the first time duration.

According to an embodiment, lengths of respective time durations provided in the plurality of third time durations may be equal to each other.

According to an embodiment, the average position change amount of the UE may be an average of the position change amount of the UE within the plurality of third time durations.

According to an embodiment, the assistance data may include one or more of information about the first threshold or information about the second threshold.

According to an embodiment, the position change amount or position change amounts of the UE may be obtained based on one or more sensors provided in the UE.

According to an embodiment, the method may further include, based on determination that positioning is required for a target UE other than the UE within the specific first time duration, receiving information related to requesting location information of the UE; and transmitting the location information of the UE in response to information related to requesting the location information.

One embodiment may provide a UE operating in a wireless communication system.

According to an embodiment, the UE may include a transceiver, and one or more processors connected to the transceiver.

According to an embodiment, the one or more processors may be configured to receive a message including assistance data for positioning via long term evolution positioning protocol (LPP) and obtain the assistance data based on the message.

According to an embodiment, the one or more processors may be configured to obtain the assistance data based on the message.

According to an embodiment, based on the UE being determined to be a positioning reference unit (PRU) within a specific first time duration in a time domain, a registration message related to registering the UE as the PRU may be transmitted via the LPP.

According to an embodiment, based on expiration of the specific first time duration, the UE may transmit a de-registration message related to de-registration from the PRU through the LPP.

According to an embodiment, the registration message may include information related to a start point of the specific first time duration.

According to an embodiment, a time offset may be configured between the start point of the specific first time duration and a time at which the registration message is transmitted.

According to an embodiment, information about the time offset may be provided in the assistance data.

According to an embodiment, based on the UE satisfying at least one of one or more predefined conditions, the UE may be determined as the PRU.

According to an embodiment, the one or more predefined conditions may include one or more of a first condition related to a position change amount of the UE being less than or equal to a first threshold within a second time duration different from the first time duration, or a second condition related to an average position change amount of the UE being less than or equal to a second threshold within a plurality of third time durations different from the first time duration.

According to an embodiment, lengths of respective time durations provided in the plurality of third time durations may be equal to each other.

According to an embodiment, the average position change amount of the UE may be an average of the position change amount of the UE within the plurality of third time durations.

According to an embodiment, the assistance data may include one or more of information about the first threshold or information about the second threshold.

According to an embodiment, the one or more processors may be configured to communicate with one or more of a mobile terminal, a network, and an autonomous vehicle other than a vehicle including the UE.

One embodiment may provide a method performed by a device in a wireless communication system.

According to an embodiment, the method may include obtaining assistance data for positioning.

According to an embodiment, the method may include transmitting a message including the assistance data to a user equipment (UE).

According to an embodiment, the message may be transmitted via long term evolution positioning protocol (LPP).

According to an embodiment, a registration message related to registering the UE as a positioning reference unit (PRU) may be received via the LPP based on the UE being determined to be a PRU within a specific first time duration in the time domain.

One embodiment may provide a device operating in a wireless communication system.

According to an embodiment, the device may include a transceiver, and one or more processors connected to the transceiver.

According to an embodiment, the one or more processors may be configured to obtain assistance data for positioning.

According to an embodiment, the one or more processors may be configured to transmit a message including the assistance data to a UE.

According to an embodiment, the message may be transmitted via long term evolution positioning protocol (LPP).

According to an embodiment, a registration message related to registering the UE as a positioning reference unit (PRU) may be received via the LPP based on the UE being determined to be a PRU within a specific first time duration in the time domain.

One embodiment may provide a device operating in a wireless communication system.

According to an embodiment, the device may include at least one processor, and one or more memories operatively connected to the one or more processors and configured to store one or more instructions that, when executed, cause the one or more processors to perform an operation.

According to an embodiment, the operation may include receiving a message including assistance data for positioning via long term evolution positioning protocol (LPP).

According to an embodiment, the operation may include obtaining the assistance data based on the message.

According to an embodiment, a registration message related to registering the UE as a positioning reference unit (PRU) may be transmitted via the LPP based on the UE being determined to be a PRU within a specific first time duration in the time domain.

One embodiment may provide a non-transitory processor-readable medium storing one or more instructions causing one or more processors to perform an operation.

According to an embodiment, the operation may include receiving a message including assistance data for positioning via long term evolution positioning protocol (LPP).

According to an embodiment, the operation may include obtaining the assistance data based on the message.

According to an embodiment, a registration message related to registering the UE as a positioning reference unit (PRU) may be transmitted via the LPP based on the UE being determined to be a PRU within a specific first time duration in the time domain.

One embodiment may provide a non-transitory processor-readable medium storing one or more instructions causing one or more processors to perform an operation.

The foregoing solutions are merely a part of the examples of the present disclosure and various examples into which the technical features of the present disclosure are incorporated may be derived and understood by persons skilled in the art from the following detailed description.

According to one embodiment, a signal can be effectively transmitted and received in a wireless communication system.

According to one embodiment, positioning can be effectively performed in a wireless communication system.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

The embodiment is applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

The embodiment is described in the context of a 3GPP communication system (e.g., including LTE, NR, 6G, and next-generation wireless communication systems) for clarity of description, to which the technical spirit of the embodiment is not limited. For the background art, terms, and abbreviations used in the description of the embodiment, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System

1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
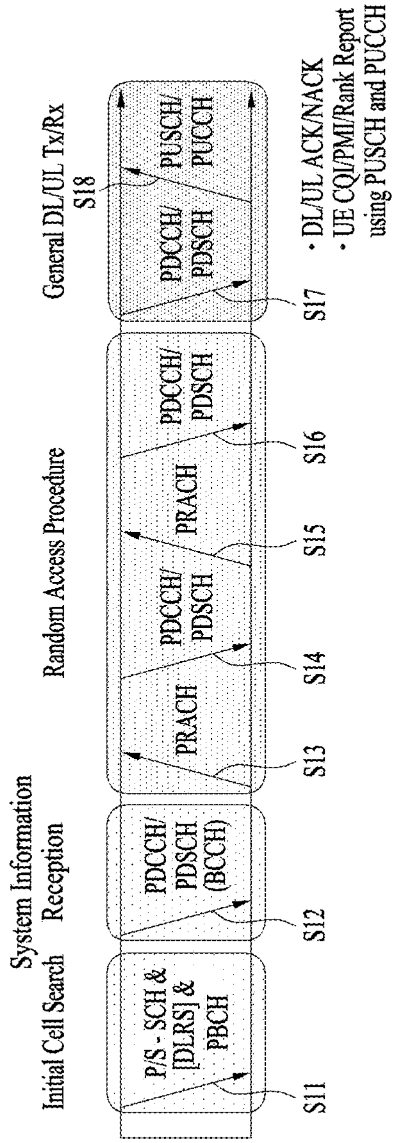
FIG. 1 is a diagram illustrating physical channels and a signal transmission method using the physical channels, which may be used in the embodiment.

FIG. 1 is a diagram illustrating physical channels and a signal transmission method using the physical channels, which may be used in the embodiment.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information)

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Physical Resource

Figure 2:
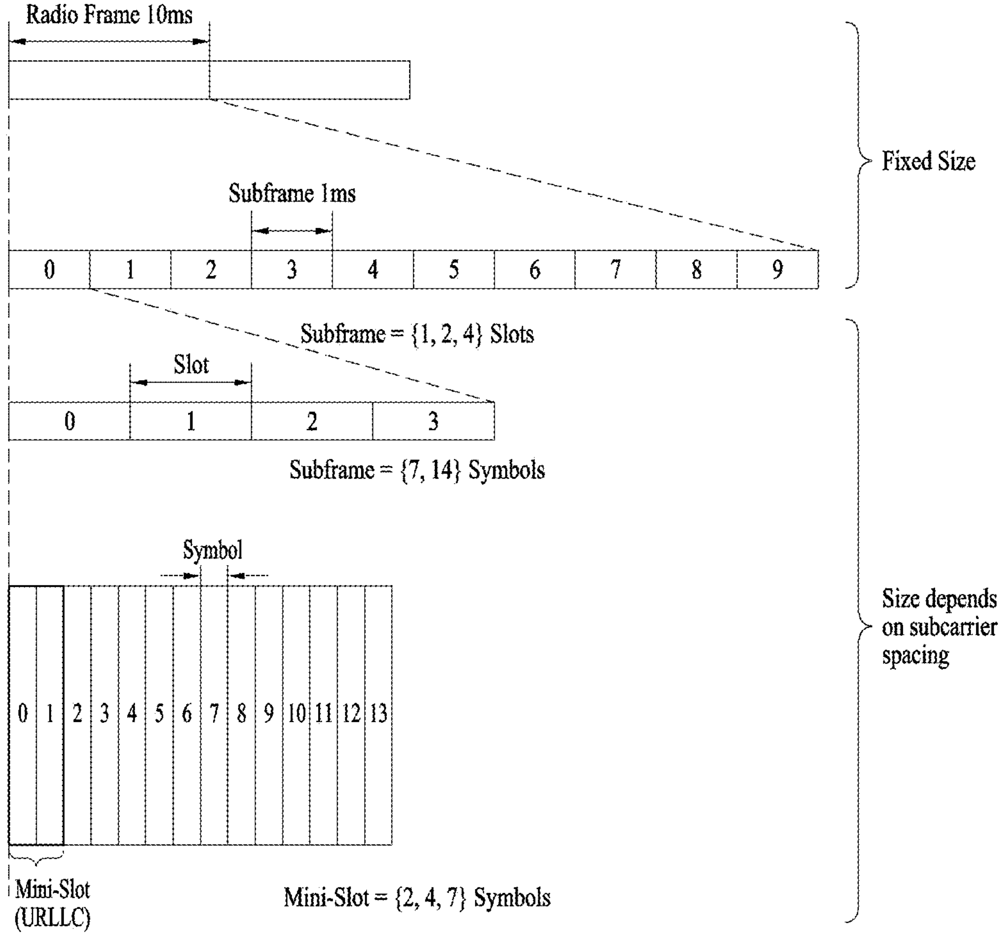
FIG. 2 is a diagram illustrating a radio frame structure in a new radio access technology (NR) system to which the embodiment is applicable.

FIG. 2 is a diagram illustrating a radio frame structure in a new radio access technology (NR) system to which the embodiment is applicable.

The NR system may support multiple numerologies. A numerology may be defined by a subcarrier spacing (SCS) and a cyclic prefix (CP) overhead. Multiple SCSs may be derived by scaling a default SCS by an integer N (or u). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part, u and a CP are obtained from RRC parameters provided by the BS.

TABLE 1

| μ | $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mm Wave) band.

Table 2 below defines the NR frequency band, by way of example.

TABLE 2

| Frequency range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, Tc=1/(Δfmax*Nf) where Δfmax=480*103 Hz and a value Nf related to a fast Fourier transform (FFT) size or an inverse fast Fourier transform (IFFT) size is given as Nf=4096. Tc and Ts which is an LTE-based time unit and sampling time, given as Ts=1/((15 kHz)*2048) are placed in the following relationship: Ts/Tc=64. DL and UL transmissions are organized into (radio) frames each having a duration of Tf=(Δfmax*Nf/100)*Tc=10 ms. Each radio frame includes 10 subframes each having a duration of Tsf=(Δfmax*Nf/1000)*Tc=1 ms. There may exist one set of frames for UL and one set of frames for DL. For a numerology μ, slots are numbered with nμs∈{0, . . . , Nslot,μsubframe−1} in an increasing order in a subframe, and with nμs,f∈{0, . . . , Nslot,μframe−1} in an increasing order in a radio frame. One slot includes Nμsymb consecutive OFDM symbols, and Nμsymb depends on a CP. The start of a slot nμs in a subframe is aligned in time with the start of an OFDM symbol nμs*Nμsymb in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, Nslot symb represents the number of symbols in a slot, $N^{frame,\mu}{}_{slot}$ represents the number of slots in a frame, and $N^{subframe,\mu}{}_{slot}$ represents the number of slots in a subframe.

In the NR system to which the embodiment is applicable, different OFDM (A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 6, one subframe may include four slots. One subframe={1, 2, 4} slots in FIG. 7, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Regarding physical resources in the NR system, antenna ports, a resource grid, resource elements (REs), resource blocks (RBs), carrier parts, and so one may be considered. The physical resources in the NR system will be described below in detail.

An antenna port is defined such that a channel conveying a symbol on an antenna port may be inferred from a channel conveying another symbol on the same antenna port. When the large-scale properties of a channel carrying a symbol on one antenna port may be inferred from a channel carrying a symbol on another antenna port, the two antenna ports may be said to be in a quasi-co-located or quasi-co-location (QCL) relationship. The large-scale properties include one or more of delay spread, Doppler spread, frequency shift, average received power, received timing, average delay, and a spatial reception (Rx) parameter. The spatial Rx parameter refers to a spatial (Rx) channel property parameter such as an angle of arrival.

Figure 3:
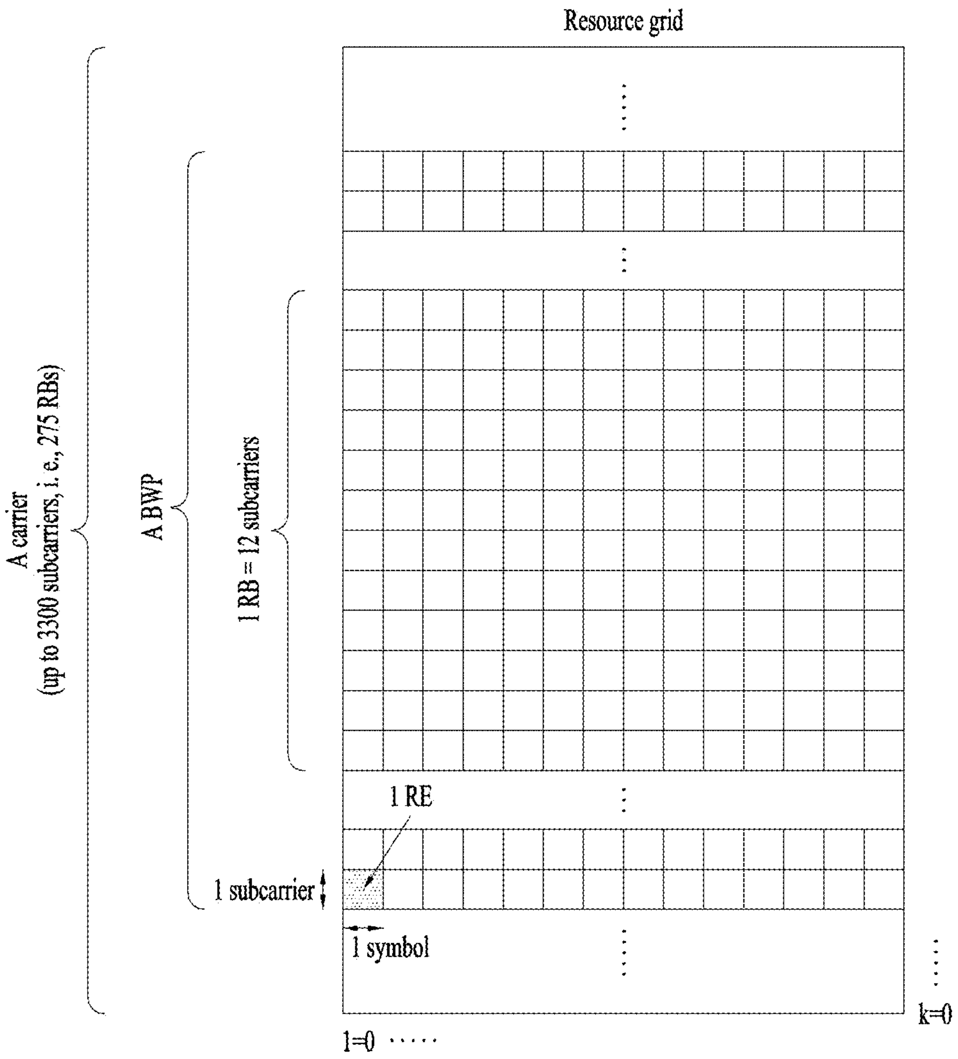
FIG. 3 is a diagram showing a resource grid based on an NR system to which one embodiment can be applied.

FIG. 3 illustrates an exemplary resource grid to which the embodiment is applicable.

Referring to FIG. 3, for each subcarrier spacing (SCS) and carrier, a resource grid is defined as $14\times 2^{\mu}$ OFDM symbols by $$N_{grid}^{size,\mu} \times N_{SC}^{RB}$$

subcarriers, where $$N_{grid}^{size,\mu}$$

is indicated by RRC signaling from the BS.

$$N_{grid}^{size,\mu}$$

may vary according to an SCS configuration u and a transmission direction, UL or DL. There is one resource grid for an SCS configuration μ, an antenna port p, and a transmission direction (UL or DL). Each element of the resource grid for the SCS configuration μ and the antenna port p is referred to as an RE and uniquely identified by an index pair (k, l) where k represents an index in the frequency domain, and l represents a symbol position in the frequency domain relative to a reference point. The RE (k, l) for the SCS configuration μ and the antenna port p corresponds to a physical resource and a complex value $$a_{k,l}^{(p,\mu)}.$$

An RB is defined as $$N_{SC}^{RB} = 12$$

consecutive subcarriers in the frequency domain.

Considering that the UE may not be capable of supporting a wide bandwidth supported in the NR system, the UE may be configured to operate in a part (bandwidth part (BWP)) of the frequency bandwidth of a cell.

Figure 4:
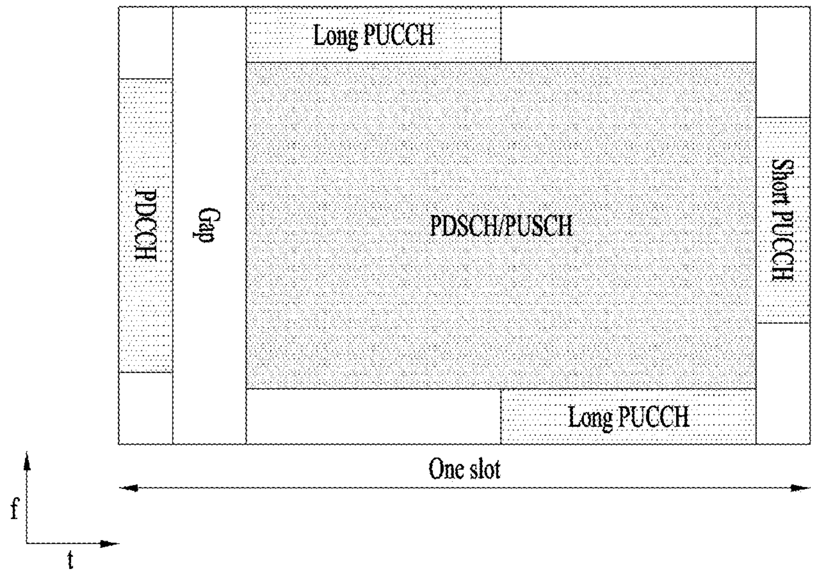
FIG. 4 is a diagram illustrating mapping of physical channels in a slot, to which the embodiment is applicable.

FIG. 4 is a diagram illustrating exemplary mapping of physical channels in a slot, to which the embodiment is applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

The BS transmits related signals to the UE on DL channels as described below, and the UE receives the related signals from the BS on the DL channels.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P) RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling.

The UE transmits related signals on later-described UL channels to the BS, and the BS receives the related signals on the UL channels from the UE.

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH.

2. Positioning

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

2.1. Positioning Protocol Configuration

Figure 5:
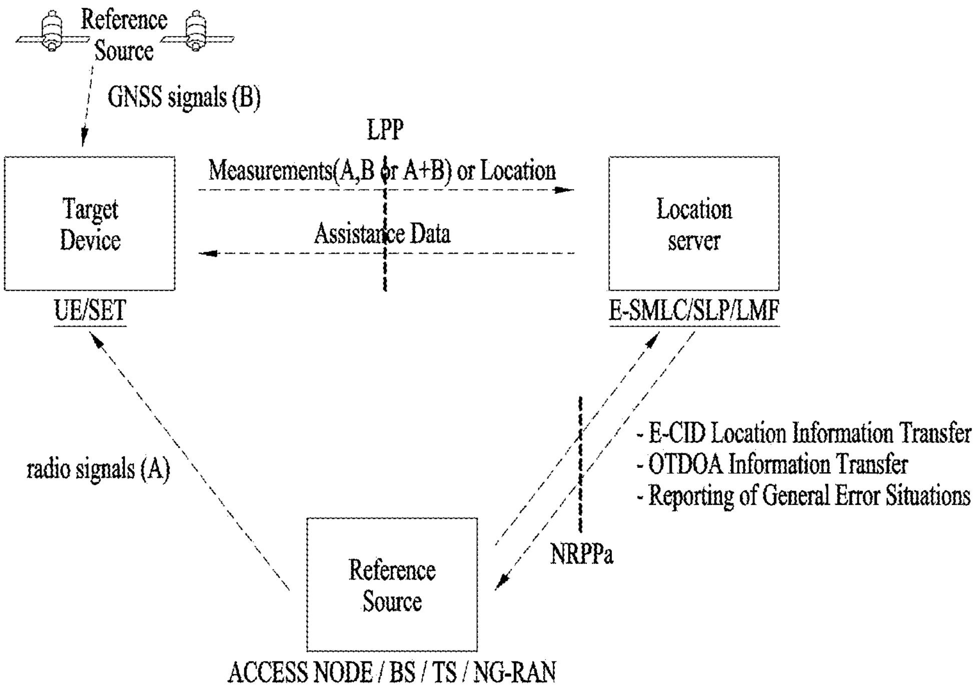
FIG. 5 is a diagram illustrating an exemplary positioning protocol configuration for user equipment (UE) positioning, which is applicable to the embodiment.

FIG. 5 is a diagram illustrating an exemplary positioning protocol configuration for positioning a UE, to which the embodiment is applicable.

Referring to FIG. 5, an LTE positioning protocol (LPP) may be used as a point-to-point protocol between a location server (E-SMLC and/or SLP and/or LMF) and a target device (UE and/or SET), for positioning the target device using position-related measurements obtained from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

E-CID Location Information Transfer. This function allows the reference source to exchange location information with the LMF for the purpose of E-CID positioning.

OTDOA Information Transfer. This function allows the reference source to exchange information with the LMF for the purpose of OTDOA positioning.

Reporting of General Error Situations. This function allows reporting of general error situations, for which function-specific error messages have not been defined.

2.2. PRS (Positioning Reference Signal)

For such positioning, a positioning reference signal (PRS) may be used. The PRS is a reference signal used to estimate the position of the UE.

A positioning frequency layer may include one or more PRS resource sets, each including one or more PRS resources.

Sequence Generation

A PRS sequence r(m) (m=0, 1, . . . ) may be defined by Equation 1.

$$r(m) = \frac{1}{\sqrt{2}}(1 - 2c(m)) + j\frac{1}{\sqrt{2}}(1 - 2c(m+1)) \quad \text{[Equation 1]}$$

In Equation 1, c(i) may be a pseudo-random sequence. A pseudo-random sequence generator may be initialized by Equation 2.

$$c_{init} = \left(2^{22}\left\lfloor\frac{n_{ID,seq}^{PRS}}{1024}\right\rfloor + 2^{10}\left(N_{symb}^{slot} n_{s,f}^{\mu} + l + 1\right)\left(2\left(n_{ID,seq}^{PRS} \bmod 1024\right) + 1\right) + \left(n_{ID,seq}^{PRS} \bmod 1024\right)\right) \bmod 2^{31} \quad \text{[Equation 2]}$$

$$n_{s,f}^{\mu}$$

may be a slot number in a frame in an SCS configuration μ. A DL PRS sequence ID $$n_{ID,seq}^{PRS} \in \{0, 1, \ldots, 4095\}$$

may be given by a higher-layer parameter (e.g., DL-PRS-SequenceId). 1 may be an OFDM symbol in a slot to which the sequence is mapped.

Mapping to Physical Resources in a DL PRS Resource

BPRS A PRS sequence r(m) may be scaled by $\beta_{PRS}$ and mapped to REs $(k,l)_{p,\mu}$, specifically by Equation 3. $(k,l)_{p,\mu}$ may represent an RE (k,l) for an antenna port p and the SCS configuration μ.

$$\begin{aligned} a_{k,l}^{(p,\mu)} &= \beta_{PRS} r(m) \\ m &= 0, 1, \ldots \\ k &= mK_{comb}^{PRS} + \left(\left(k_{offset}^{PRS} + k'\right) \bmod K_{comb}^{PRS}\right) \\ l &= l_{start}^{PRS}, l_{start}^{PRS} + 1, \ldots, l_{start}^{PRS} + L_{PRS} - 1 \end{aligned} \quad \text{[Equation 3]}$$

Herein, the following conditions may have to be satisfied:

The REs $(k,l)_{p,\mu}$ are included in an RB occupied by a DL PRS resource configured for the UE;

The symbol l not used by any SS/PBCH block used by a serving cell for a DL PRS transmitted from the serving cell or indicated by a higher-layer parameter SSB-positionInBurst for a DL PRS transmitted from a non-serving cell;

A slot number satisfies the following PRS resource set-related condition;

$$l_{start}^{PRS}$$

is the first symbol of the DL PRS in the slot, which may be given by a higher-layer parameter DL-PRS-ResourceSymbolOffset. The time-domain size of the DL PRS resource, $L_{PRS} \in \{2, 4, 6, 12\}$ may be given by a higher-layer parameter DL-PRS-NumSymbols. A comb size $$K_{comb}^{PRS} \in \{2, 4, 6, 12\}$$

may be given by a higher-layer parameter transmission-Comb. A combination $$\{L_{PRS}, K_{comb}^{PRS}\}$$

of $L_{PRS}$ and $$K_{comb}^{PRS}$$

may be one of {2, 2}, {4, 2}, {6, 2}, {12, 2}, {4, 4}, {12, 4}, {6, 6}, {12, 6} and/or {12, 12}. An RE offset $$k_{offset}^{PRS} \in \{0, 1, \ldots, K_{comb}^{PRS} - 1\}$$

may be given by combOffset. A frequency offset k' may be a function of $$l - l_{start}^{PRS}$$

as shown in Table 5.

TABLE 5

| | Symbol number within the downlink $PRS$ resource $l - l_{start}^{PRS}$ | | | | | | | | | | | |
|---|---|---|---|---|---|---|---|---|---|---|---|---|
| $K_{comb}^{PRS}$ | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

A reference point for k=0 may be the position of point A in a positioning frequency layer in which the DL PRS resource is configured. Point A may be given by a higher-layer parameter dl-PRS-PointA-r16.

Mapping to Slots in a DL PRS Resource Set

A DL PRS resource included in a DL PRS resource set may be transmitted in a slot and a frame which satisfy the following Equation 4.

$$\left(N_{slot}^{frame,\mu} n_f + n_{s,f}^{\mu} - T_{offset}^{PRS} - T_{offset,res}^{PRS}\right) \bmod 2^{\mu} T_{per}^{PRS} \in \left\{i T_{gap}^{PRS}\right\}_{i=0}^{T_{rep}^{PRS}-1} \quad \text{[Equation 4]}$$

$$N_{slot}^{frame,\mu}$$

may be the number of slots per frame in the SCS configuration μ. $n_f$ may be a system frame number (SFN).

$$n_{s,f}^{\mu}$$

may be a slot number in a frame in the SCS configuration μ. A slot offset $$T_{offset}^{PRS} \in \{0, 1, \ldots, T_{per}^{PRS} - 1\}$$

may be given by a higher-layer parameter DL-PRS-ResourceSetSlotOffset. A DL PRS resource slot offset $$T_{offset,res}^{PRS}$$

may be given by a higher layer parameter DL-PRS-ResourceSlotOffset. A periodicity $$T_{per}^{PRS} \in \{4, 5, 8, 10, 16, 20, 32, 40, 64, 80, 160, 320, 640, 1280, 2560, 5120, 10240\}$$

may be given by a higher-layer parameter DL-PRS-Periodicity. A repetition factor $$T_{rep}^{PRS} \in \{1, 2, 4, 6, 8, 16, 32\}$$

may be given by a higher-layer parameter DL-PRS-ResourceRepetitionFactor. A muting repetition factor $$T_{muting}^{PRS}$$

may be given by a higher-layer parameter DL-PRS-MutingBitRepetitionFactor. A time gap $$T_{gap}^{PRS} \in \{1, 2, 4, 8, 16, 32\}$$

may be given by a higher-layer parameter DL-PRS-ResourceTimeGap.

2.3. UE Positioning Architecture

Figure 6:
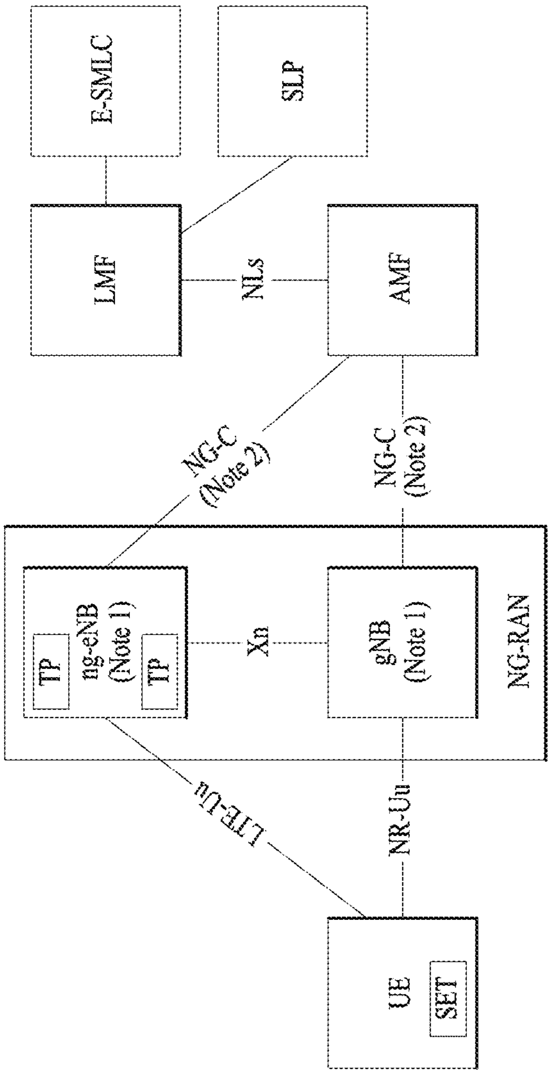
FIG. 6 is a diagram illustrating an example of an architecture of a system for positioning a UE, to which the embodiment is applicable.

FIG. 6 illustrates an exemplary system architecture for measuring positioning of a UE to which the embodiment is applicable.

Referring to FIG. 6, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several TPs, such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support OTDOA, which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QOS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

2.4. Operation for UE Positioning

Figure 7:
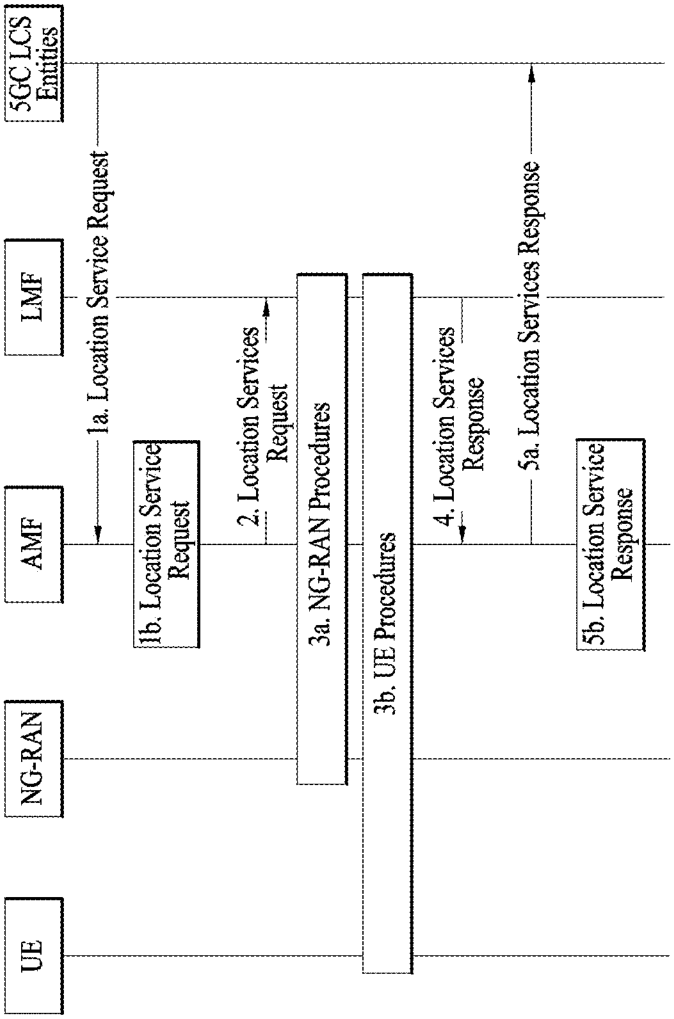
FIG. 7 is a diagram illustrating an example of a procedure of positioning a UE, to which the embodiment is applicable.

FIG. 7 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 7. In other words, in FIG. 7 it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 7. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 7 has been initiated by step 1a, the AMF may transfer the location service response to a 5GC entity such as a GMLC. If the procedure of FIG. 9 has been initiated by step 1b, the AMF may use the location service response in order to provide a location service related to an emergency call.

2.5. Positioning Protocol

LTE Positioning Protocol (LPP)

Figure 8:
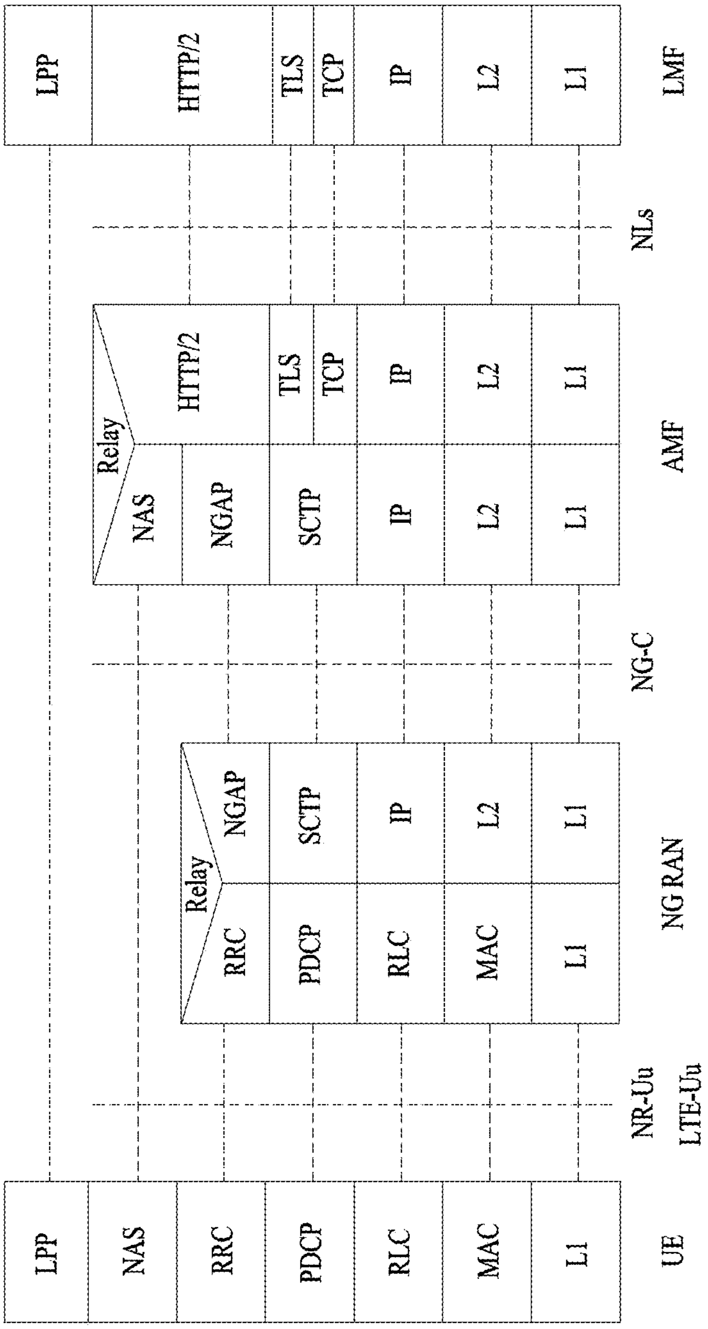
FIG. 8 is a diagram illustrating protocol layers for supporting LTE positioning protocol (LPP) message transmission, to which the embodiment is applicable.

FIG. 8 illustrates an exemplary protocol layer used to support LPP message transfer between an LMF and a UE. An LPP protocol data unit (PDU) may be carried in a NAS PDU between an AMF and the UE.

Figure 10:
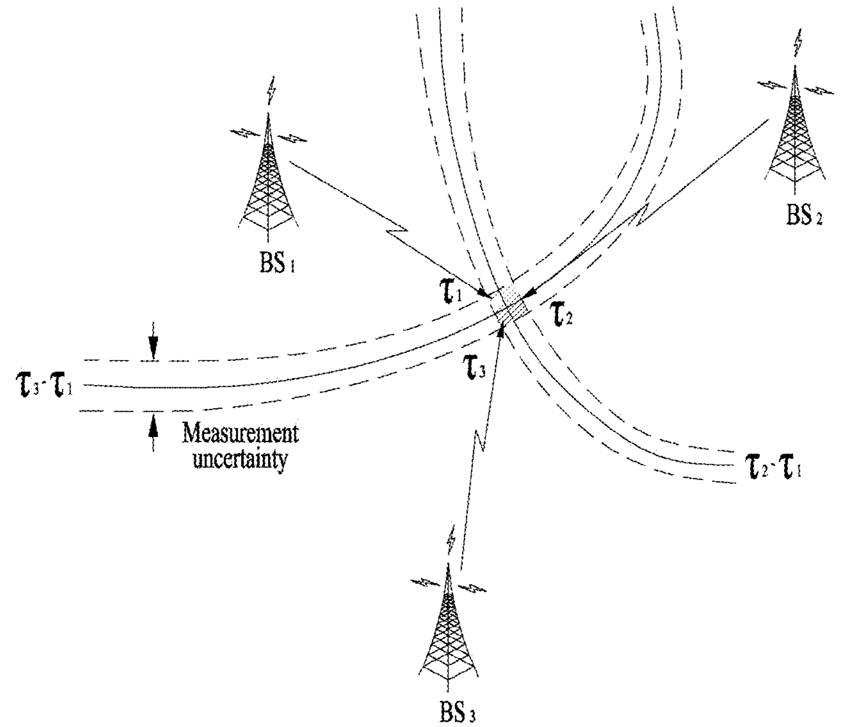
FIG. 10 is a diagram illustrating an observed time difference of arrival (OTDOA) positioning method, to which the embodiment is applicable.

Referring to FIG. 10, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol A (NRPPa)

Figure 9:
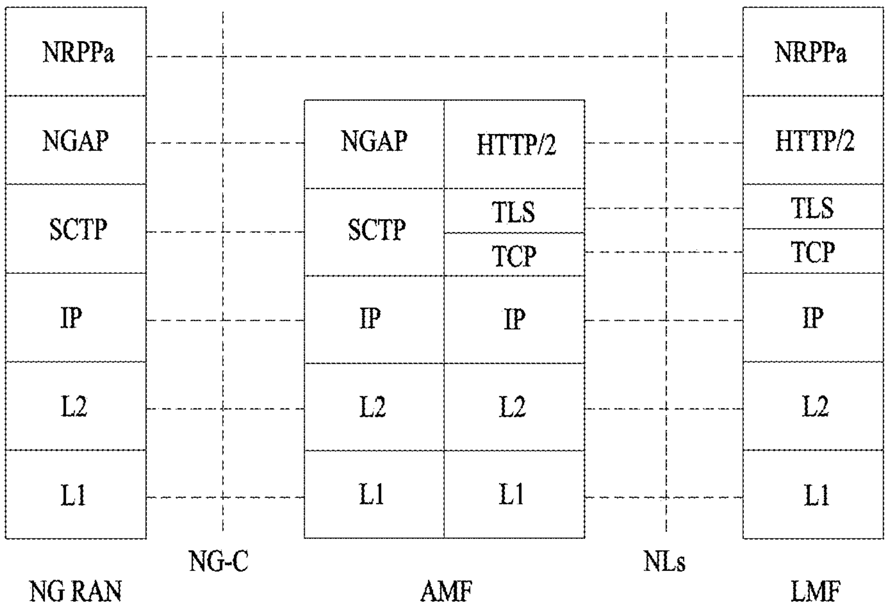
FIG. 9 is a diagram illustrating protocol layers for supporting NR positioning protocol A (NRPPa) protocol data unit (PDU) transmission, to which the embodiment is applicable.

FIG. 9 illustrates an exemplary protocol layer used to support NRPPa PDU transfer between an LMF and an NG-RAN node.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transfer of information about a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.6. Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

OTDOA (Observed Time Difference Of Arrival)

FIG. 10 is a diagram illustrating an observed time difference of arrival (OTDOA) positioning method, to which the embodiment is applicable:

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 5 below.

$$RSTDi_{,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \quad \text{[Equation 5]}$$

In Equation 5, c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i - T_1)$ is a transmission time offset between two TPs, referred to as "real time differences" (RTDs), and $n_i$ and $n_1$ are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (Rx)-transmission (Tx) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB Rx-Tx time difference, timing advance (TADV), and/or AoA Here, TADV may be divided into Type 1 and Type 2 as follows.

$T_{ADV}$ Type 1=(ng-eNB Rx-Tx time difference)+(UE E-UTRA Rx-Tx time difference)

$T$ADV Type 2=ng-eNB Rx-Tx time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

Multi RTT (Multi-Cell RTT)

Figure 11:
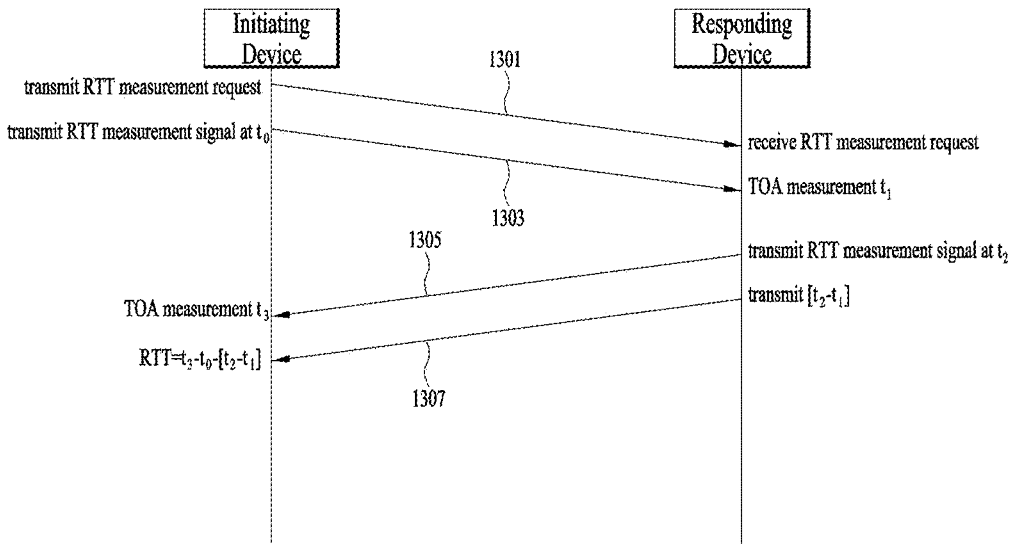
FIG. 11 is a diagram illustrating a multi-round trip time (multi-RTT) positioning method to which the embodiment is applicable.
Figure 11:
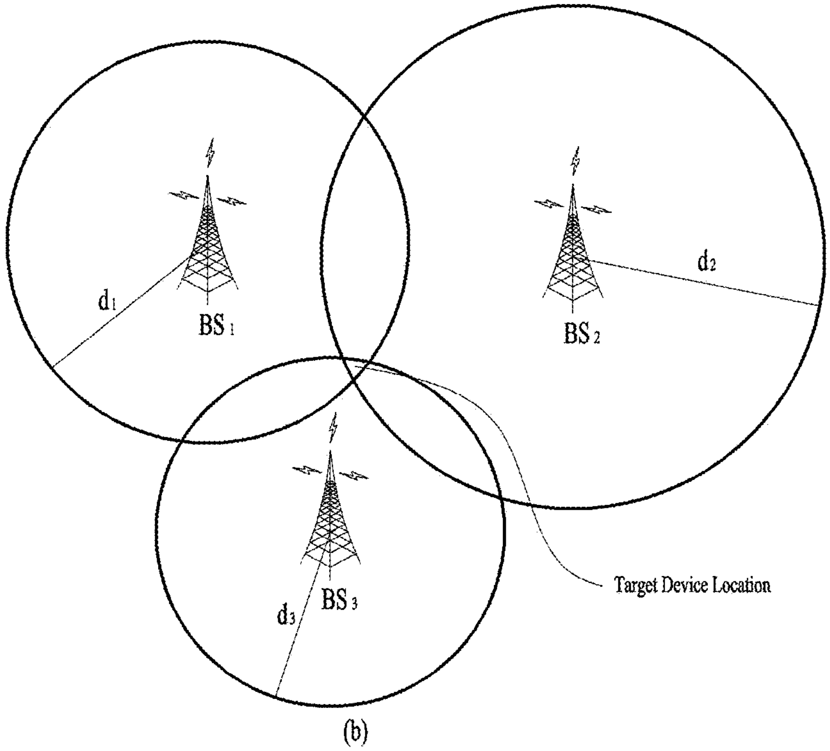

FIG. 11 is a diagram illustrating an exemplary multi-round trip time (multi-RTT) positioning method to which the embodiment is applicable.

Referring to FIG. 11(*a*), an exemplary RTT procedure is illustrated, in which an initiating device and a responding device perform ToA measurements, and the responding device provides ToA measurements to the initiating device, for RTT measurement (calculation). The initiating device may be a TRP and/or a UE, and the responding device may be a UE and/or a TRP.

In operation 1301 according to the embodiment, the initiating device may transmit an RTT measurement request, and the responding device may receive the RTT measurement request.

In operation 1303 according to the embodiment, the initiating device may transmit an RTT measurement signal at t0 and the responding device may acquire a ToA measurement t1.

In operation 1305 according to the embodiment, the responding device may transmit an RTT measurement signal at t2 and the initiating device may acquire a ToA measurement t3.

In operation 1307 according to the embodiment, the responding device may transmit information about [t2−t1], and the initiating device may receive the information and calculate an RTT by Equation 6. The information may be transmitted and received based on a separate signal or in the RTT measurement signal of operation 1305.

$$RTT = t_3 - t_0 - [t_2 - t_1] \quad \text{[Equation 6]}$$

Referring to FIG. 11(*b*), an RTT may correspond to a double-range measurement between two devices. Positioning estimation may be performed from the corresponding information, and multilateration may be used for the positioning estimation. $d_1$, $d_2$, and $d_3$ may be determined based on the measured RTT, and the location of a target device may be determined to be the intersection of the circumferences of circles with radiuses of $d_1$, $d_2$, and $d_3$, in which $BS_1$, $BS_2$, and $BS_3$ (or TRPs) are centered, respectively.

2.7. Sounding Procedure

In a wireless communication system to which the embodiment is applicable, an SRS for positioning may be used.

An SRS-Config information element (IE) may be used to configure SRS transmission. (A list of) SRS resources and/or (a list of) SRS resource sets may be defined, and each resource set may be defined as a set of SRS resources.

The SRS-Config IE may include configuration information on an SRS (for other purposes) and configuration information on an SRS for positioning separately. For example, configuration information on an SRS resource set for the SRS (for other purposes) (e.g., SRS-ResourceSet) and configuration information on an SRS resource set for the SRS for positioning (e.g., SRS-PosResourceSet) may be included separately. In addition, configuration information on an SRS resource for the SRS (for other purposes) (e.g., SRS-ResourceSet) and configuration information on an SRS resource for the SRS for positioning (e.g., SRS-PosResource) may be included separately.

An SRS resource set for positioning may include one or more SRS resources for positioning. Configuration information on the SRS resource set for positioning may include: information on an identifier (ID) that is assigned/allocated/related to the SRS resource set for positioning; and information on an ID that is assigned/allocated/related to each of the one or more SRS resources for positioning. For example, configuration information on an SRS resource for positioning may include an ID assigned/allocated/related to a UL resource. In addition, each SRS resource/SRS resource set for positioning may be identified based on each ID assigned/allocated/related thereto.

The SRS may be configured periodically/semi-persistently/aperiodically.

An aperiodic SRS may be triggered by DCI. The DCI may include an SRS request field.

Table 6 shows an exemplary SRS request field.

TABLE 6

| Value of SRS request field | Triggered aperiodic SRS resource set(s) for DCI format 0_1, 0_2, 1_1, 1_2, and 2_3 configured with higher layer parameter srs-TPC-PDCCH-Group set to 'typeB' | Triggered aperiodic SRS resource set(s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured by SRS-ResourceSet with higher layer parameter aperiodicSRS-ResourceTrigger set to 1 or an entry in aperiodicSRS-ResourceTriggerList set to 1 SRS resource set(s) configured by SRS-PosResourceSet with an entry in aperiodicSRS-ResourceTriggerList set to 1 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a 1st set of serving cells configured by higher layers |
| 10 | SRS resource set(s) configured by SRS-ResourceSet with higher layer parameter aperiodicSRS-ResourceTrigger set to 2 or an entry in aperiodicSRS-ResourceTriggerList set to 2 SRS resource set(s) configured by SRS-PosResourceSet with an entry in aperiodicSRS-ResourceTriggerList set to 2 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a 2nd set of serving cells configured by higher layers |
| 11 | SRS resource set(s) configured by SRS-ResourceSet with higher layer parameter aperiodicSRS-ResourceTrigger set to 3 or an entry in aperiodicSRS-ResourceTriggerList set to 3 SRS resource set(s) configured by SRS-PosResourceSet with an entry in aperiodicSRS-ResourceTriggerList set to 3 when triggered by DCI formats 0_1, 0_2, 1_1, and 1_2 | SRS resource set(s) configured with higher layer parameter usage in SRS-ResourceSet set to 'antennaSwitching' and resourceType in SRS-ResourceSet set to 'aperiodic' for a 3rd set of serving cells configured by higher layers |

In Table 6 srs-TPC-PDCCH-Group is a parameter for setting the triggering type for SRS transmission to type A or type B, aperiodicSRS-ResourceTriggerList is a parameter for configuring an additional list of DCI code points where the UE needs to transmit the SRS according to the SRS resource set configuration, aperiodicSRS-ResourceTrigger is a parameter for configuring a DCI code point where the SRS needs to be transmitted according to the SRS resource set configuration, and resourceType is a parameter for configuring (periodic/semi-static/aperiodic) time domain behavior of the SRS resource configuration.

3. Embodiment

A detailed description will be given of the embodiment based on the above technical ideas. The afore-described contents of Section 1 and Section 2 are applicable to the embodiment described below. For example, operations, functions, terminologies, and so on which are not defined in the embodiment may be performed and described based on Section 1 and Section 2.

Symbols/abbreviations/terms used in the description of the embodiment may be defined as follows.

A/B/C: A and/or B and/or C

AOA (AoA): angle of arrival

CSI-RS: channel state information reference signal

ECID: enhanced cell identifier

GPS: global positioning system

GNSS: global navigation satellite system

LMF: location management function

OTDOA (OTDoA): observed time difference of arrival

PRS: positioning reference signal

RAT: radio access technology

RS: reference signal

RTT: round trip time

RSRP: reference signal received power

RSRQ: reference signal received quality

RSTD: reference signal time difference/relative signal time difference

SINR: signal to interference plus noise ratio)

SNR: signal to noise ratio

TOA (ToA): time of arrival

TRP: transmission and reception point (TP: transmission point)

In the description of the embodiment, a BS may be understood as a comprehensive term including a remote radio head (RRH), an eNB, a gNB, a TP, a reception point (RP), a relay, and the like.

In the description of the embodiment, the expression 'greater than/above A' may be replaced with the expression 'above/greater than A'.

In the description of the embodiment, the expression 'less than/below B' may be replaced with the expression 'below/less than B'.

Researches have been conducted into various methods for improving the results of positioning measurement in the existing NR system. One of the methods is to use a reference station scheme in an NR system to improve timing measurements.

That is, for LMF to measure the location of a target UE, a reference UE and/or a reference BS, the exact locations of which are recognized, may be used. The UE and/or the BS, the exact locations of which are recognized by the LMF, may be defined as a positioning reference unit (PRU).

In the case of PRU, there may be restrictions on movement because the LMF side needs to fully recognize the location information. When the UE is used as the PRU, it may be advantageous to use a normal UE as the PRU as much as possible because artificially installing a large number of PRUs in a fixed location is not desired in terms of consumption efficiency. However, the normal UE has mobility, and thus it may be difficult for the LMF side to actively use the normal UE.

According to an embodiment, a method of using a normal UE as a reference UE may be provided.

For example, a method may be provided to actively configure and/or use a normal UE as a reference UE through artificial intelligence (AI) and/or machine learning (ML).

For example, in addition to AI/ML algorithms used in the description of an embodiment described below, signaling and/or procedures associated with the PRU may also be applied to non-AI/ML based positioning methods. For example, even in the case of positioning measurement using a positioning method that is not AI/ML-based, signaling/procedures and other embodiments, excluding some AI/ML algorithm-related (input/output parameters/algorithm itself) described in the description of an embodiment described below, may be used.

In a method according to an embodiment, AI/ML algorithms/models used in the UE/BS/LMF may be the same or different from each other.

The method according to an embodiment may be used regardless of a RRC state.

In the description of an embodiment, procedures and/or methods and/or related messages that are commonly described regardless of the scenario may be used/applied regardless of the scenario.

In a description of an embodiment, the reporting contents of a positioning reference UE (reference UE) may be different from those of a normal UE (not a reference UE), and the corresponding information may be provided in the request location information. If there is no separate request, the reporting contents of the reference UE and normal UE may be the same.

Figure 12:
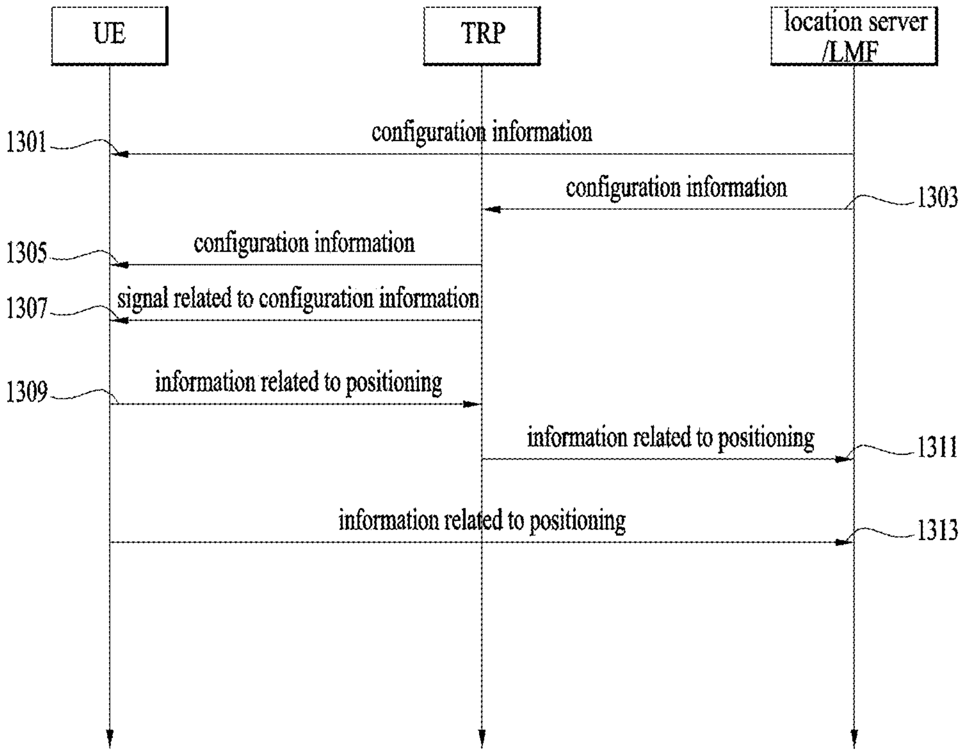
FIG. 12 is a simplified diagram illustrating an operating method of a UE, a TRP, a location server, and/or an LMF according to the embodiment.

FIG. 12 is a simplified diagram illustrating an operating method of a UE, a TRP, a location server, and/or an LMF according to the embodiment.

Referring to FIG. 12, in operation 1301 according to the embodiment, the location server and/or the LMF may transmit configuration indicated to the UE and the UE may receive the configuration information.

In operation 1303 according to the embodiment, the location server and/or the LMF may transmit reference configuration information to the TRP and the TRP may receive the reference configuration information. In operation 1305 according to the embodiment, the TRP may transmit the reference configuration information to the UE and the UE may receive the reference configuration information. In this case, operation 1301 according to the embodiment may be omitted.

In contrast, operations 1303 and 1305 according to the embodiment may be omitted. In this case, operation 1301 according to the embodiment may be performed.

That is, operation 1301 according to the embodiment, and operations 1303 and 1305 according to the embodiment may be selectively performed.

In operation 1307 according to the embodiment, the TRP may transmit a signal related to the configuration information and the UE may receive the signal related to the configuration information. For example, the signal related to the configuration information may be a signal for positioning of the UE.

In operation 1309 according to the embodiment, the UE may transmit a signal related to positioning to the TRP and the TRP may receive the signal related to positioning. In operation 1311 according to the embodiment, the TRP may transmit the signal related to positioning to the location server and/or the LMF and the location server and/or the LMF may receive the signal related to positioning.

In operation 1313 according to the embodiment, the UE may transmit the signal related to positioning to the location server and/or the LMF and the location server and/or the LMF may receive the signal related to positioning. In this case, operations 1309 and 1311 according to the embodiment may be omitted.

In contrast, operation 1313 according to the embodiment may be omitted. In this case, operations 1309 and 1311 according to the embodiment may be performed.

That is, operations 1309 and 1311 according to the embodiment, and operation 1313 according to the embodiment may be selectively performed.

According to the embodiment, the signal related to positioning may be obtained based on the configuration information and/or the signal related to the configuration information.

Figure 13:
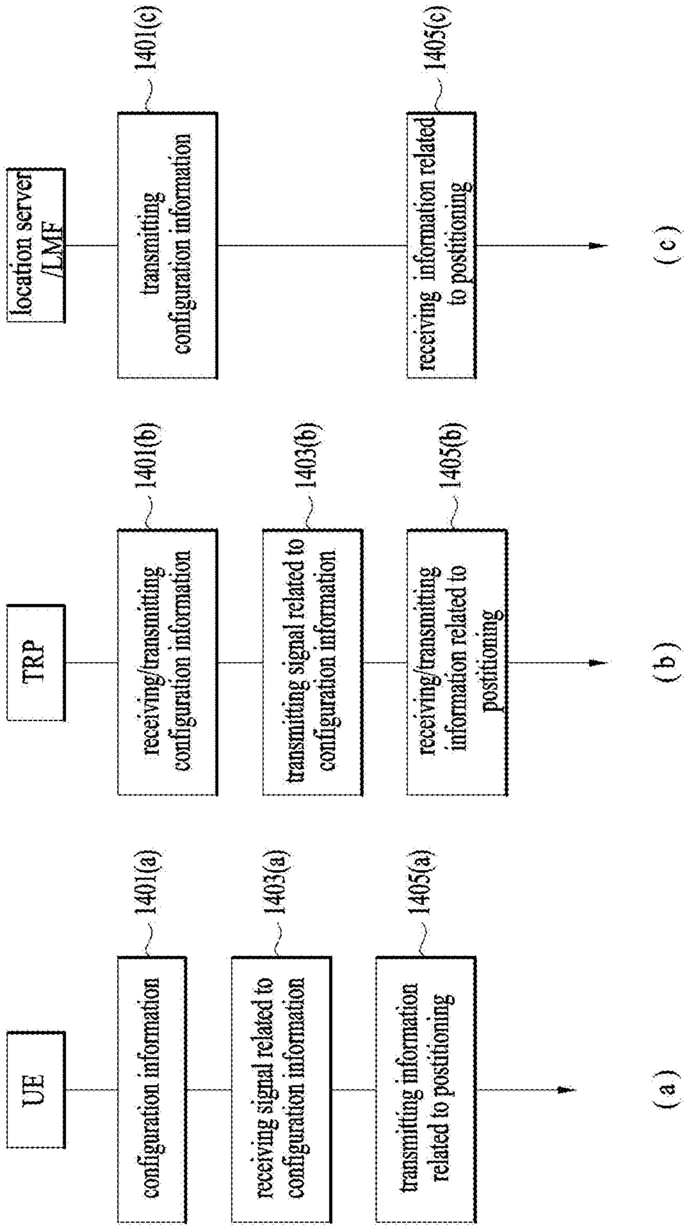
FIG. 13 is a simplified diagram illustrating a method of operating a UE, a TRP, a location server, and/or an LMF according to the embodiment.

FIG. 13 is a simplified diagram illustrating an operating method of a UE, a TRP, a location server, and/or an LMF according to the embodiment.

Referring to FIG. 13(*a*), in operation 1401(*a*) according to the embodiment, the UE may receive configuration information.

In operation 1403(*a*) according to the embodiment, the UE may receive a signal related to the configuration information.

In operation 1405(*a*) according to the embodiment, the UE may transmit information related to positioning.

Referring to FIG. 13(*b*), in operation 1401(*b*) according to the embodiment, the TRP may receive configuration information from the location server and/or the LMF and transmit the configuration information to the UE.

In operation 1403(*b*) according to the embodiment, the TRP may transmit a signal related to the configuration information.

In operation 1405(*b*) according to the embodiment, the TRP may receive information related to positioning and transmit the information related to positioning to the location server and/or the LMF.

Referring to FIG. 13(*c*), in operation 1401(*c*) according to the embodiment, the location server and/or the LMF may transmit configuration information.

In operation 1405(*c*) according to the embodiment, the location server and/or the LMF may receive information related to positioning.

For example, the above-described configuration information may be understood as relating to reference configuration (information) or one or more pieces of information that the location server, the LMF, and/or the TRP transmits to/configures for the UE and/or may be understood as the reference configuration (information) or one or more pieces of information that the location server, the LMF, and/or the TRP transmits to/configures for the UE, in a description of the embodiment below.

For example, the above signal related to positioning may be understood as a signal related to one or more pieces of information that the UE reports and/or a signal including one or more pieces of information that the UE reports, in a description of the embodiment below.

For example, in a description of the embodiment below, the BS, the gNB, and the cell may be replaced with the TRP, the TP, or any device serving equally as the TRP or the TP.

For example, in a description of the embodiment below, the location server may be replaced with the LMF and any device serving equally as the LMF.

More detailed operations, functions, terms, etc. in operation methods according to the embodiment may be performed and described based on the embodiment described later. The operation methods according to the embodiment is exemplary and one or more operations in the above-described operation methods may be omitted according to detailed content of each embodiment.

Hereinafter, the embodiment will be described in detail. It may be understood by those of ordinary skill in the art that the embodiment described below may be combined in whole or in part to implement other embodiments unless mutually exclusive.

For example, timing delay may differ due to errors such as non-calibration for each panel and/or antenna group of a BS and/or a UE requiring location measurement. To this end, the LMF may use the reference UE and/or the reference BS that recognizes the exact location to measure the location of the target UE. In the description for an embodiment, the UE and/or the BS, the extract locations of which are recognized by the LMF, may be defined as a positioning reference unit (PRU).

In the case of PRU, there may be restrictions on movement because the LMF side needs to fully recognize the location information. When a UE other than a BS is used as a PRU, artificially installing a large number of PRUs in a fixed location is not desired in terms of consumption efficiency, and the UE has mobility, and accordingly, it may be difficult to actively utilize the UE at the LMF side.

When the PRU is used for position measurement, various information to be obtained may be utilized for position calculation of the target UE because measurement results are obtained from the UE and/or the BS that recognizes the location, such as may be easily used for estimation of the Tx timing error group (TEG) of the BS and/or a differential method such as in a carrier phase.

In the case of a BS, the location is fixed, and thus may be easily used as a PRU, but when a normal UE is used as a PRU, there may be overhead in having to install a PRU at any location. There may be many restrictions on the use of the normal UE because the mobility of the normal UE may cause frequent changes in location.

When the UE moves in a fixed location and/or in a certain direction for a certain period of time, more PRUs may be utilized by utilizing the UE as the PRU. According to an embodiment, a procedure, a method, and/or a message may be provided for the LMF and/or the UE to determine that a normal UE may be a PRU.

From Rel-17, the PRU has been discussed to enable the use of measurement results from the UE and/or the BS, the locations of which are recognized by the LMF to calculate the location of a target UE. In general, the LMF may request the measurement results from the UE through a RAT (in) dependent method.

For example, the RAT dependent method may vary depending on DL-TDOA/DL-AoD/UL-AoA/multi-RTT/E-CID, or the like, but the UE may basically transmit timing measurement results such as RSTD, Rx-Tx time difference, or the like and/or power measurement results such as RSRP and/or RSRQ to the LMF as measurement results. For example, information about a movement direction and distance of the UE may not be transmitted.

However, for example, in the case of RAT independence, the UE may transmit it heading information and/or distance traveled between segments of the UE to the LMF via a sensor based method. For example, in the case of sensor-based measurement results, the following direction and distance information during a specific time interval measured based on a reference time may be transmitted along with duration information (tn−1 and tn).

Direction: Bearing (direction (heading) of the horizontal displacement measured clockwise)

Distance: Horizontal (unit. 1 cm): Vertical (unit. 1 cm) between time tn−1 and tn According to an embodiment, a configuration method may be provided to enable a normal UE to be utilized as a PRU.

For example, an embodiment may be based on AL/ML. For example, an embodiment may be provided for parts to be considered in terms of the subject-specific procedures and related messages of AI/ML, and/or details on the input and output parameters of AI/ML algorithms, and/or an additionally required aspect.

For example, depending on the entity performing the ML, the detailed procedures and related messages may vary as follows.

Detailed Procedures and Related Messages for Each Scenario

Scenario #1: LMF-Based

According to an embodiment, in scenario #1, based on a measurement report of a normal UE in the LMF, a normal UE in which a fixed location and/or a biased movement is expected may be predicted and determined and whether the normal UE is a PRU may be determined at a LMF side by using instance values of the corresponding measurement report as an input data set of the AI/ML algorithm.

According to an embodiment, a detailed procedure may be as follows.

Figure 14:
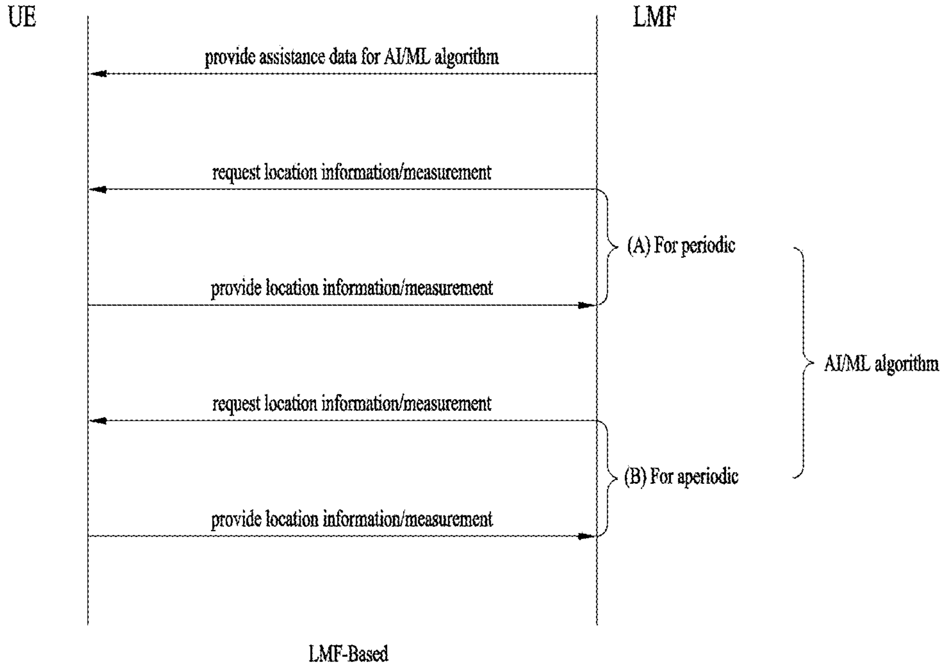
FIG. 14 is a diagram showing an example of a reference UE determination procedure according to an embodiment.

FIG. 14 is a diagram showing an example of a reference UE determination procedure according to an embodiment. FIG. 14 shows an example of a determination procedure in an LMF.

Referring to FIG. 14, according to an embodiment, the LMF may provide assistance data for an AI/ML algorithm to the UE. According to embodiment, (A) the LMF may request to periodically report location information and/or measurements, and the UE may periodically report location information and/or measurement results. And/or, according to embodiment, (B) the LMF may request to aperiodically report location information and/or measurements, and the UE may aperiodically report location information and/or measurement results.

According to an embodiment, the LMF may perform an operation for an AI/ML algorithm based on reported information. For example, the operation for the AI/ML algorithm may include determining whether a UE is to be a PRU. According to an embodiment, it may be determined whether a UE is to be a PRU based on information reported from the UE without any operation for a separate AI/ML algorithm.

According to an embodiment, the LMF may directly configure/instruct the UE in advance through assistance data regarding input parameters required for the AI/ML algorithm. According to an embodiment, the UE may report, to the LMF, different contents of the measurement report depending on the indicated information.

According to an embodiment, the LMF may request whether the UE supports input data described below at a time of a capability request, and the UE may also include, in the corresponding information, information about whether the input data is to be transferred at the time of a capability report and transmit the corresponding information.

According to an embodiment, the LMF may request the corresponding information when requesting location measurement based on the capability of the UE. And/or, according to an embodiment, the information may be instructed/configured to be statically transmitted in common assistance information (e.g., provide assistance data in LPP message) such as PRS. According to an embodiment, the LMF may include periodic information to make periodic measurement requests (FIG. 14(A)) and/or may temporarily/aperiodically request a measurement report to a corresponding UE when requested by an application based on event triggering (FIG. 14(B)).

According to an embodiment, the UE may transmit measurement results based on the instructed/configured information. According to an embodiment, when the UE is unable to transmit information due to a state change within a periodic report, for example, when the UE is unable to report measurement results to the LMF due to an idle/inactive state transition, the UE may transmit measurement results from a previous idle/inactive state together with the state transition to a connected state. According to an embodiment, when requesting measurement results, the LMF may request measurement results from a previous point in time as well as the current point in time.

According to an embodiment, the LMF may configure the measured result as input data to perform AI/ML, and determine whether a specific UE is to be a PRU based on the output and/or indicate whether the output itself is to be a PRU or not.

According to an embodiment, the availability of PRU may be determined by regulations, and for related details, the contents of scenario #2 according to an embodiment may be referenced.

According to an embodiment, when a specific UE satisfies the condition for becoming a PRU and/or the proximity to the target UE is ensured, the LMF may consider the corresponding normal UE as a reference UE and utilize the normal UE for position measurement for the target UE.

According to an embodiment, a UE to be a reference UE may inform the LMF whether the UE may support positioning when reporting a capability for positioning, regardless of the scenario. According to an embodiment, a UE considered as a PRU may report measurement results based on measurement contents indicated/configured by a measurement request transmitted from the LMF.

Scenario #2: UE Based

According to an embodiment, in scenario #2, whether a UE is to be a reference UE may be determined at a UE side. For example, AI/ML may be performed at the UE side.

According to an embodiment, the UE may recognize/determine that the UE is to be a reference UE and transmit information to the LMF indicating that the UE is a PRU. According to an embodiment, the LMF may use the target UE when measuring the location of the target UE.

According to an embodiment, the LMF may transmit information necessary for determining suitability of a result value generated through the AI/ML algorithm of the UE through an LPP message. According to an embodiment, the LPP message may be transmitted together with assistance data information regarding positioning measurement, rather than a request message regarding measurement, because the UE needs to continuously perform measurement on its own and apply AI/ML.

According to an embodiment, the assistance data information may include information about conditions under which a UE is to be a PRU.

For example, the assistance data information may information on a width and/or window for a change amount of in parameters of the temporally generated output, and/or information on minimum requirements for the form of multiple combinations.

For example, when one of the outputs through the AI/ML algorithm is a change in 2-dimension (2-d) distance between t+n and t+n+1, an offset (threshold) that needs to be satisfied for the corresponding change and/or the required average change from t+n to t+n+k may be transmitted from the LMF to the UE.

For example, the UE may determine that the UE itself is to be a PRU when an actual average value in the corresponding section is less than a given value, and if not, the UE may operate in the same way as a normal UE without a separate report to the LMF.

According to an embodiment, before the UE makes its own determination, the LMF may transmit information about a condition for becoming a PRU to the UE, for example, the condition may be condition information about conditions and/or combinations of output data of the AI/ML algorithm of the UE.

According to an embodiment, the UE may monitor the outputs and check whether a condition is satisfied, and when the UE satisfies the condition for becoming the PRU by itself, the UE may transmit the information to the LMF through an existing LPP message and/or transmit the information that the UE is to be a PRU by itself through a new LPP message. According to an embodiment, the corresponding information may be 1-bit information indicating that the UE is to be a PRU and/or may transmit result values for outputs without a separate indication bit, and the LMF may automatically determine that the conditions for a PRU are satisfied based on the presence of the corresponding information. And/or, according to an embodiment, the UE may transmit all and/or part of the information about the input data as well as the output data of the UE to the LMF.

According to an embodiment, the UE may transmit an 'expire time' when the PRU is terminated and/or perform a de-registration request (additional LPP procedure) procedure to abandon the PRU at the own discretion of the UE. For example, in scenario #3, it is because the LMF may also perform AI/ML algorithms.

Figure 15:
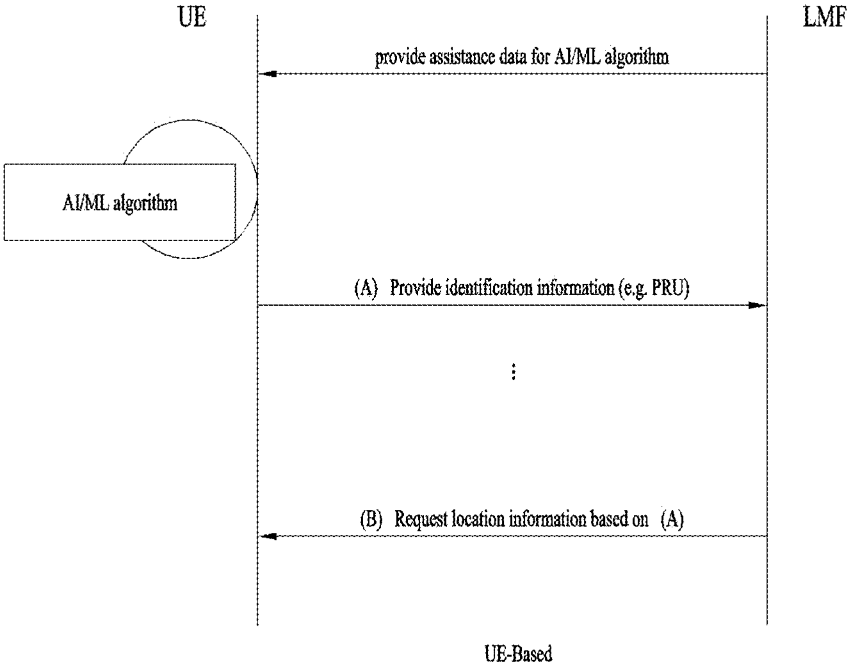
FIG. 15 is a diagram showing an example of a reference UE determination procedure according to an embodiment.

FIG. 15 is a diagram showing an example of a reference UE determination procedure according to an embodiment. FIG. 15 shows an example of a determination procedure in a UE.

Referring to FIG. 15, according to an embodiment, the LMF may provide assistance data for an AI/ML algorithm to the UE. According to an embodiment, the UE may perform an operation for an AI/ML algorithm based on the assistance data.

According to an embodiment, the UE may transmit identification information about being a PRU and/or a registration message for registering as a PRU, and the LMF may receive the same (FIG. 15(A)). According to an embodiment, the corresponding UE may be a reference UE.

According to an embodiment, when there is a target UE for which location measurement is required, the LMF may transmit a measurement request to the reference UE (FIG. 15(B)).

For example, the contents of the corresponding measurement request may be configured differently from the normal UE. For example, the LMF may request the reference UE to provide different information based on the identification information and/or the registration message, and the UE may transmit the measurement result information based on the request message.

Scenario #3: Joint Based

According to an embodiment, in scenario #3, information may be exchanged between a UE and an LMF to determine whether the UE is to be a reference UE. For example, in scenario #3, the LMF and the UE in scenarios #1 and #2 may each perform AI/ML, and necessary information for each may be exchanged.

According to an embodiment, both the UE and the BS may perform the operations described in Scenarios #1 and #2 in parallel, respectively. According to an embodiment, the UE may perform location optimization and the LMF may perform global optimization.

For example, in addition to the condition information for the PRU described in Scenario #2, the LMF may directly configure the number of hidden layers, number of nodes, and activation functions per layer that are directly required for setting the AI/ML algorithm. For example, if there is an activation function at the UE side for producing a synergistic effect with the result values of the activation functions that LMF itself uses, or when there is a desired algorithm, the LMF itself may transmit the algorithm to the UE. For example, the corresponding information may also be instructed/configured from the LMF to the UE in Scenario #2. However, for example, the UE is not required to unconditionally follow the instruction information, and even if the information is configured/instructed, if the UE uses the information differently, the UE may need to report the information to the LMF.

According to an embodiment, in scenario #3, the UE may performs AI/ML dependent on its own result values, and the LMF performs AI/ML from a macroscopic perspective utilizing information obtained from surrounding UEs and BSs. According to an embodiment, in scenario #3, all of the procedures and associated messages described in each of scenarios #1 and #2 may be utilized. According to an embodiment, the selection/determination for the PRU may be made by the UE itself, and/or the LMF may make the determination and transfer information about the determination to the UE. According to an embodiment, even if the selection is different between the UE and the LMF, the UE may follow the determination of the LMF because the LMF performs AI/ML from a global perspective. That is, the selection/determination of the UE may be prioritized.

Input and Output Parameter for AI/ML Algorithm

Input Parameters

In scenarios #1 to #3 according to the embodiment described above, input parameters of the AI/ML algorithm in the UE and the BS are described.

According to an embodiment, the input parameter may include measurement result values according to a RAT-dependent/RAT-independent method reported from a UE side. For example, the input parameter may be part and/or all of the measurement results information elements (IEs) for each positioning method.

And/or, for example, the input parameter may be a combination of information elements (IEs) regardless of the method. For example, the input parameter may include duration, which is a part of the total information elements to be transmitted sensor-based, and/or distance change (vertical/horizontal) and/or directional (bearing information) within the corresponding duration. For example, a portion of the total information elements to be measured using RAT dependent methods (e.g., RSRP) may be configured as an input parameter.

According to an embodiment, input parameters may be the same or different for each UE, and the UE may transmit information about input parameters to the LMF, or the LMF may request the information about input parameters. According to an embodiment, the LMF may directly request desired parameters for the corresponding input parameters.

According to an embodiment, in addition to the parameters to be supported up to the present (rel-17), unsupported angular velocity, 3-D distance change, or heading information in the vertical domain may be configured as input parameters. Additionally and/or separately, the presence of los/Nlos has a critical impact on positioning performance, and thus according to an embodiment, the NLos/Los indicator that the UE is able to report in Rel-17 may also be an input parameter.

Output Parameters:

In scenarios #1 to #3 according to the embodiment described above, output parameters of the AI/ML algorithm in the UE and the BS are described.

According to an embodiment, the output parameters may include all of the input parameters. According to an embodiment, each of the output parameters may be derived as a predicted value at a future point in time. According to an embodiment, the corresponding values may be output continuously in the time axis. And/or, according to an embodiment, a plurality of values may be combined in a combined form by combining/peripheral/conditional probabilistically based on the outputs and information about conditions for being each PRU and/or dependencies between parameters, and/or may be classified to simply indicate whether or not a UE or a BS is to be a PRU and have a value of ‘0’ or ‘1’. For example, ‘O’ may indicate that the UE or the BS are not to be (or are to be) a PRU, and ‘1’ may indicate that the UE or the BS are to be (or are not to bet) the PRU.

Additional Aspect

Figure 16:
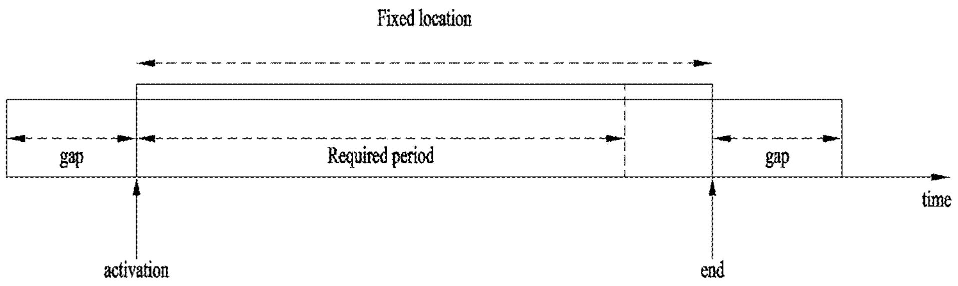
FIG. 16 shows an example of a PRU duration indication according to an embodiment.

FIG. 16 shows an example of a PRU duration indication according to an embodiment.

According to an embodiment, the condition for being a PRU may basically presuppose that a UE may ensure movement or fixation with a fixed direction and speed within a specific time.

Referring to FIG. 16, according to an embodiment, when the UE transmits a measurement report and/or information indicating that the UE is to be a PRU to the LMF, it may be necessary to transmit at least a start point at which the UE is to be the PRU to the LMF as in FIG. 16 to ensure utilization when at least the LMF uses a reference UE for a target UE. For example, although the UE may be divided according to the capabilities thereof, a UE to be predicted up to an end time may directly include and transmit the end time, and/or transmit duration information to be ensured together with the start point. In FIG. 16, within a duration, the UE may be at a fixed position and/or may be considered to be at a fixed position.

And/or, according to an embodiment, a confidence level may also be conveyed. According to an embodiment, the confidence level may be probability information, as the probability information is closer to 1, the information may be more reliable, and as the probability information is closer to 0, the information may be less reliable.

According to an embodiment, the UE and the LMF may determine that a normal UE is to be a PRU and may convey the information about whether the UE or the LMF is a PRU through an LPP message. According to an embodiment, the LPP message may be transmitted upon request for positioning measurement. According to an embodiment, the LMF may communicate to the UE within the information an expected time and/or expiration time at which the UE is to be a PRU, which the LMF itself determines.

According to an embodiment, the expire of the UE determined as a PRU may be pre-transmitted by the LMF when determining relevant expiration time information as described above, and/or additional LPP message may be defined to additionally transmit information about the expire.

According to an embodiment, when the UE determines whether the UE is a PRU by itself, a separate LPP message may be used to transmit a registration message to the LMF, a response thereto, and a message and/or response procedure for de-registration for expire may be added.

[Registration/De-Registration]

According to an embodiment, considering the latency of transmission/reception of LPP messages between the UE and the LMF, information about a gap may also be transmitted to the UE as in FIG. 16. According to an embodiment, the gap may be a value for the maximum delay considering signaling processing latency and/or additional delay environment at the UE side. For example, the value for maximum delay may be a single value by regulation, and/or may be conveyed together with the assistance information.

According to an embodiment, a role of the ‘gap’ may be a minimum time offset for the registration and activation time of the PRU conveyed in the PRU registration information (FIG. 15(A)), which may be a value considering the delay. According to an embodiment, the information may also be transmitted together with the requirement information.

Additionally and/or separately, according to an embodiment, an additional ‘gap’ may be configured with respect to the end time. According to an embodiment, the additional ‘gap’ may be for configuring the end-time considering the response of the measurement request message and the measurement report at the LMF side. According to an embodiment, the UE may report an end gap that is less than the gap even if the end time is substantially longer than the gap. According to an embodiment, both sides of the period may be ensured intervals that are obtained by considering latency values required for requests and responses of related messages.

Figure 17:
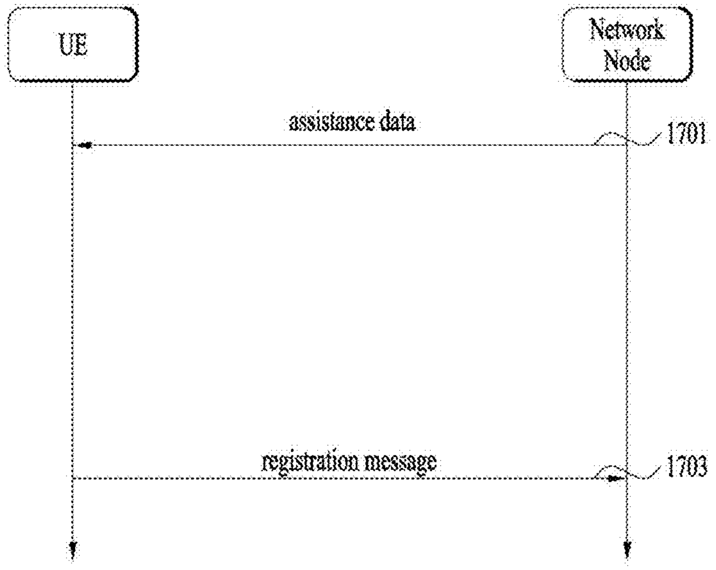
FIG. 17 is a diagram briefly illustrating an operation method of a UE and a network node according to an embodiment.

FIG. 17 is a diagram briefly illustrating an operation method of a UE and network nodes according to an embodiment.

Figure 18:
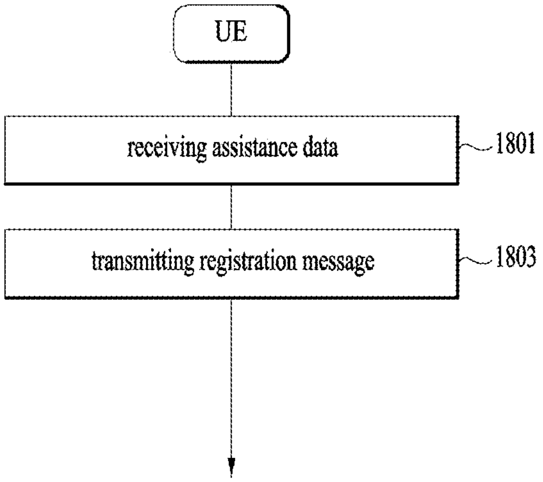
FIG. 18 is a flowchart showing an operation method of a UE according to an embodiment.

FIG. 18 is a flowchart showing an operation method of a UE according to an embodiment.

Figure 19:
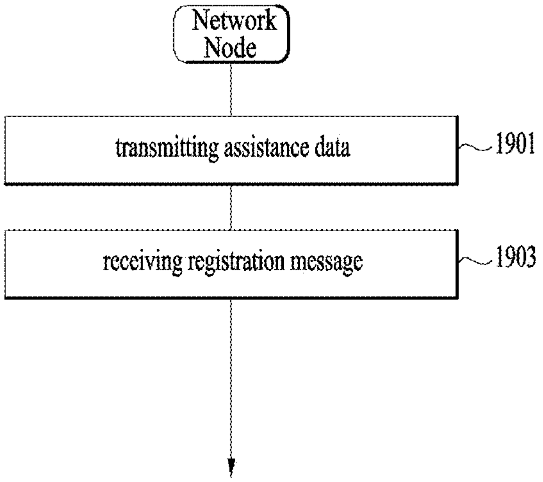
FIG. 19 is a flowchart illustrating an operation method of a network node according to an embodiment.

FIG. 19 is a flowchart illustrating an operation method of a network node according to an embodiment. For example, the network node may be a TP and/or a BS and/or a cell and/or a location server and/or an LMF and/or any device that performs the same task.

Referring to FIGS. 17 to 19, in operations 1701, 1801, and 1901 according to an embodiment, a message including assistance data for positioning may be transmitted through long term evolution positioning protocol (LPP), and a UE may receive the same.

In operations 1703, 1803, and 1903 according to an embodiment, the UE may transmit a registration message related to registering the UE as a PRU through the LPP, and the network node may receive the same. According to an embodiment, the registration message may be transmitted based on the UE being determined to be a positioning reference unit (PRU) within a specific first time duration in the time domain.

More specific operations of the UE and/or network node according to the embodiment described above may be described and performed based on the contents of Sections 1 to 3 described above.

It will be appreciated that any of examples of the above-described proposed methods may also be included as one of the embodiments and thus considered to be a kind of proposed method. Further, the above-described proposed methods may be implemented independently, and some of them may also be implemented as a combination (or merged). It may be regulated that the BS indicates to the UE whether to apply the proposed methods (or information about rules for the proposed methods) through a predefined signal (e.g., a physical-layer signal or a higher-layer signal).

4. Exemplary Configurations of Devices Implementing Embodiment of the Disclosure

4.1. Exemplary Configurations of Devices to which Embodiment of the Disclosure is Applied FIG. 20 is a diagram illustrating devices that implement various embodiments of the disclosure.

Figure 20:
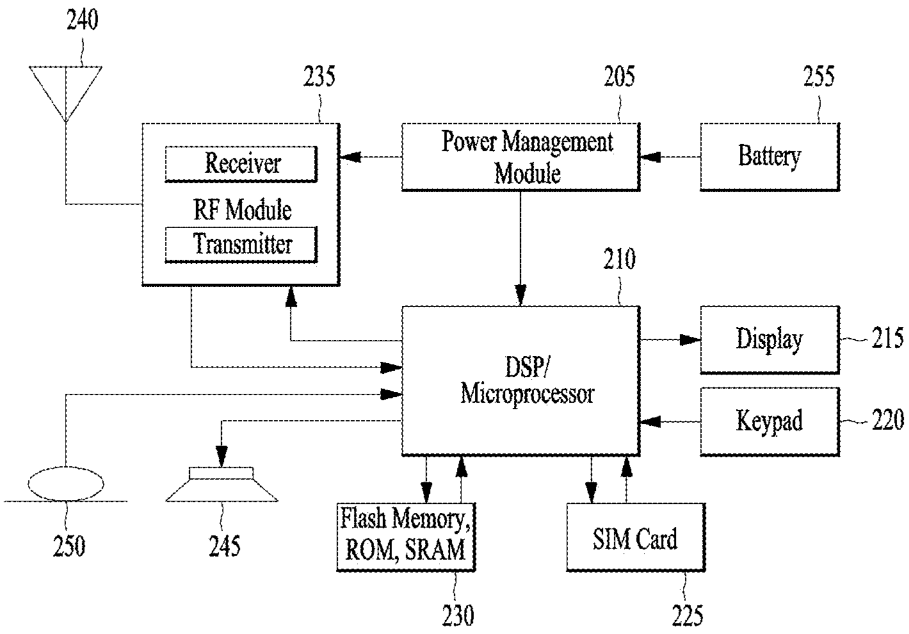
FIG. 20 is a diagram illustrating devices that implement an embodiment of the disclosure.

The devices illustrated in FIG. 20 may be a UE and/or a BS (e.g., an eNB or gNB, or a TP) adapted to perform the above-descried mechanism, or any devices that perform the same operations.

Referring to FIG. 20, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 20 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 20 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

According to the embodiment, the UE or the BS or the location server may include at least one transceiver, at least one memory, and at least one processor coupled to the at least one transceiver and the at least one memory. The at least one memory may store instructions which cause the at least one processor to perform the following operations.

The communication device included in the UE or the BS or the location server may be configured to include the at least one processor and the at least one memory. The communication device may be configured to include the at least one transceiver or to be coupled to the at least one transceiver without including the at least one transceiver.

The TP and/or the BS and/or the cell and/or the location server and/or the LMF and/or any device performing the same operation may be referred to as a network node.

According to an embodiment, one or more processors provided in a UE (or one or more processors of a communication device provided in the UE) may be configured to receive a message including assistance data for positioning via a long term evolution positioning protocol (LPP).

According to an embodiment, one or more processors provided in the UE may be configured to obtain the assistance data based on the message.

According to an embodiment, a registration message related to registering the UE as a positioning reference unit (PRU) may be transmitted via the LPP based on the UE being determined to be a PRU within a specific first time duration in the time domain.

According to an embodiment, one or more processors provided in a network node (or one or more processors of a communication device provided in the network node) may be configured to obtain assistance data for positioning.

According to an embodiment, one or more processors provided in a network node may be configured to transmit a message including the assistance data to a UE.

According to an embodiment, the message may be transmitted via long term evolution positioning protocol (LPP).

According to an embodiment, a registration message related to registering the UE as a positioning reference unit (PRU) may be received via the LPP based on the UE being determined to be a PRU within a specific first time duration in the time domain.

More specific operations of the processor included in the UE and/or the network node according to the above-described embodiment may be described and performed based on the contents of the above-described sections 1 to 3.

Embodiments may be implemented in combination/conjunction with each other unless they contradict each other. For example, a UE and/or a network node (a processor included in the UE and/or the network node) according to an embodiment may perform combined/merged operations of the embodiments of the above-described sections 1 to 3, unless they contradict each other.

4.2. Example of Communication System to Embodiment of the Disclosure is Applied In the present specification, various embodiments of the disclosure have been mainly described in relation to data transmission and reception between a BS and a UE in a wireless communication system. However, various embodiments of the disclosure are not limited thereto. For example, various embodiments of the disclosure may also relate to the following technical configurations.

The various descriptions, functions, procedures, proposals, methods, and/or operational flowcharts of the various embodiments of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
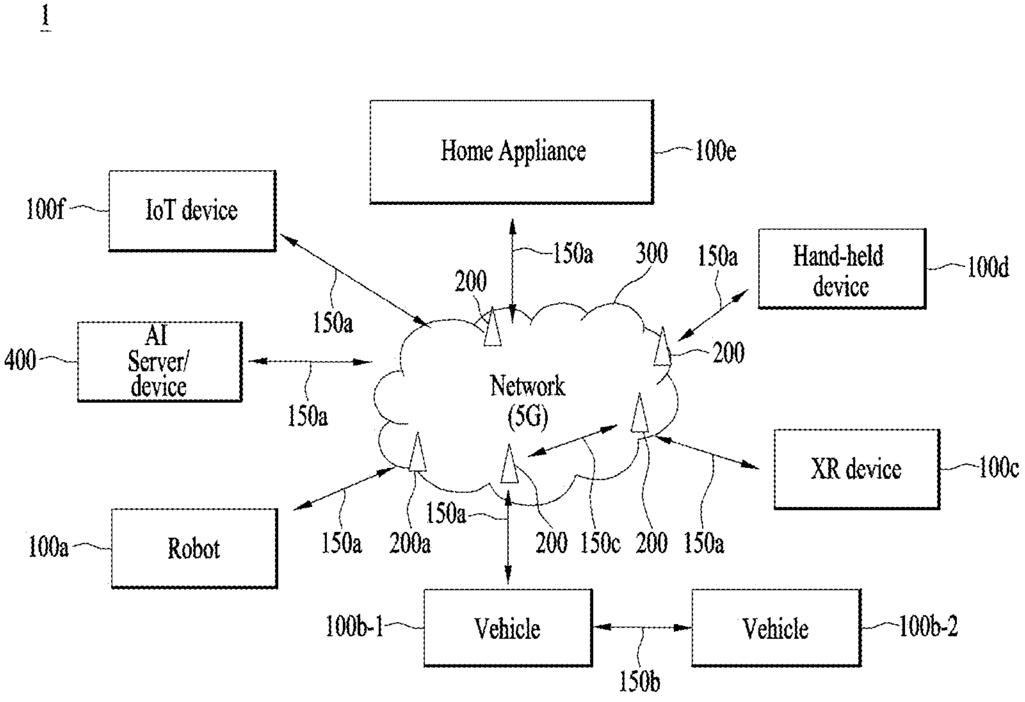
FIG. 21 illustrates an exemplary communication system applied to an embodiment of the disclosure.

FIG. 21 illustrates an exemplary communication system to which various embodiments of the disclosure are applied.

Referring to FIG. 21, a communication system 1 applied to the various embodiments of the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an extended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the disclosure.

Figure 22:
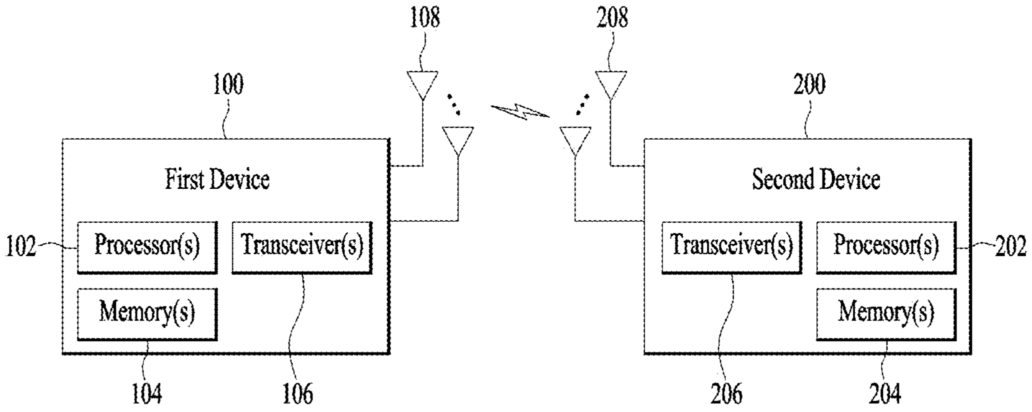
FIG. 22 illustrates exemplary wireless devices applied to an embodiment.

Example of Wireless Devices to which Embodiment of the Disclosure is Applied FIG. 22 illustrates exemplary wireless devices to which various embodiments of the disclosure are applicable.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the disclosure, one or more memories (e.g., 104 or 204) may store instructions or programs which, when executed, cause one or more processors operably coupled to the one or more memories to perform operations according to various embodiments or implementations of the disclosure.

According to various embodiments of the disclosure, a computer-readable storage medium may store one or more instructions or computer programs which, when executed by one or more processors, cause the one or more processors to perform operations according to various embodiments or implementations of the disclosure.

According to various embodiments of the disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the disclosure.

Figure 23:
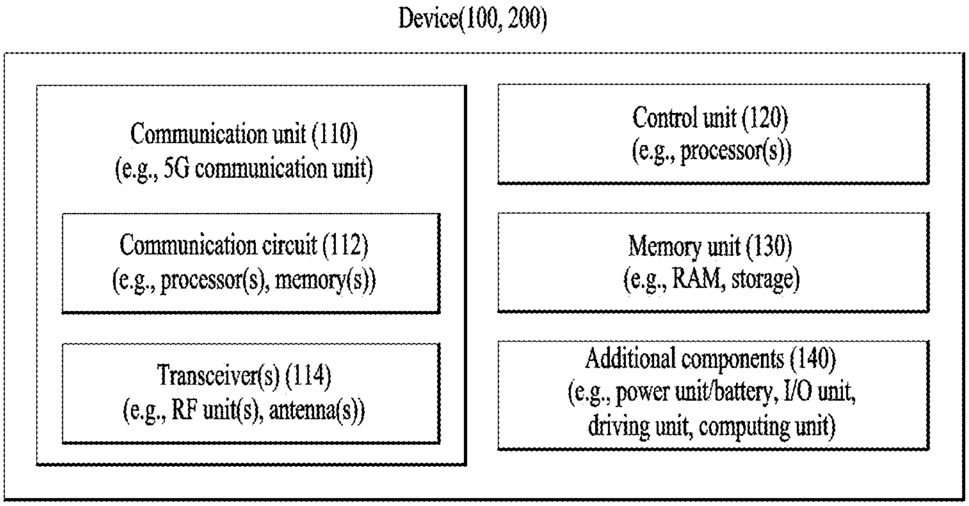
FIG. 23 illustrates other exemplary wireless devices applied to an embodiment.

Example of Using Wireless Devices to which Embodiment of the Disclosure is Applied FIG. 23 illustrates other exemplary wireless devices to which various embodiments of the disclosure are applied. The wireless devices may be implemented in various forms according to a use case/service (see FIG. 21).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. W1), the vehicles (100*b*-1 and 100*b*-2 of FIG. W1), the XR device (100*c* of FIG. W1), the hand-held device (100*d* of FIG. W1), the home appliance (100*e* of FIG. W1), the IoT device (100*f* of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Example of Portable Device to which Embodiment of the Disclosure is Applied

Figure 24:
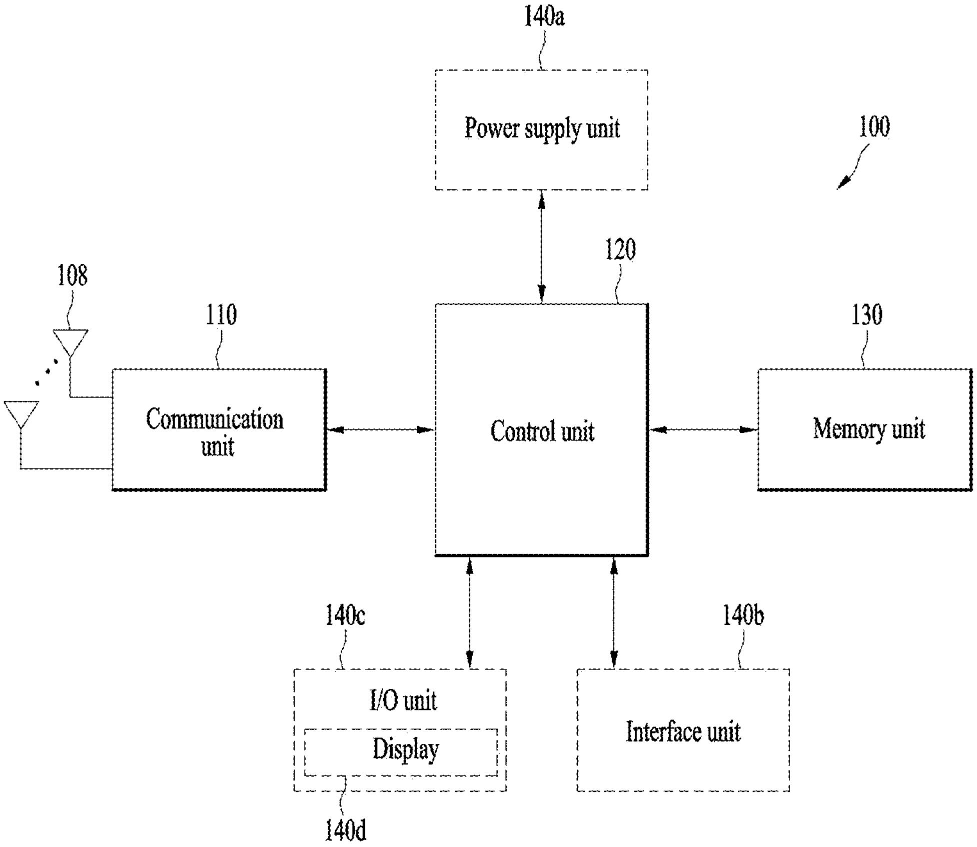
FIG. 24 illustrates an exemplary portable device applied to an embodiment.

FIG. 24 illustrates an exemplary portable device to which various embodiments of the disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 24, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Figure 25:
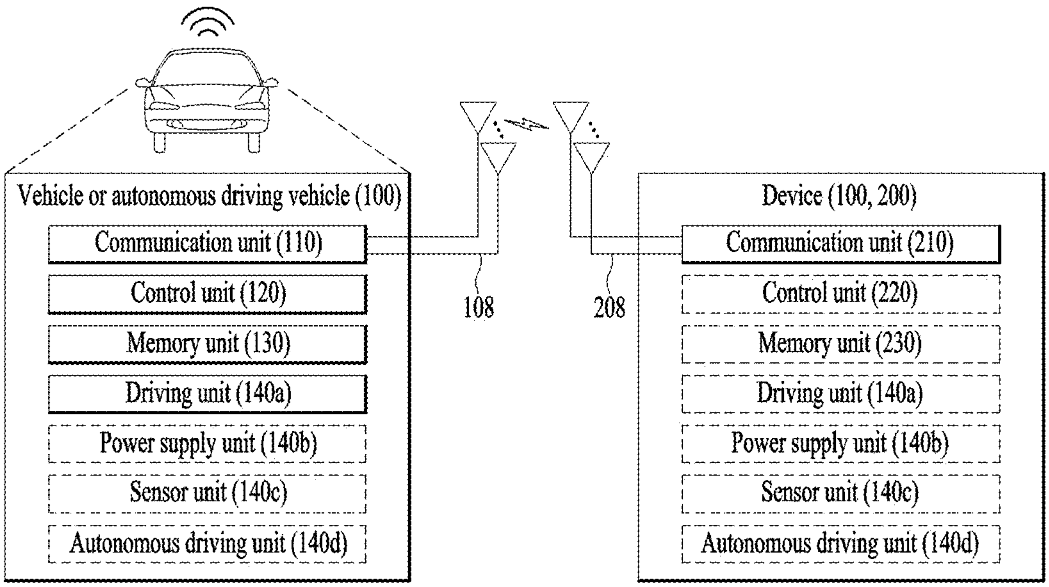
FIG. 25 illustrates an exemplary vehicle or autonomous driving vehicle applied to an embodiment.

Example of Vehicle or Autonomous Driving Vehicle to which Embodiment of the Disclosure is Applied FIG. 25 illustrates an exemplary vehicle or autonomous driving vehicle to which various embodiments of the disclosure. The vehicle or autonomous driving vehicle may be implemented as a mobile robot, a car, a train, a manned/unmanned aerial vehicle (AV), a ship, or the like.

Referring to FIG. 25, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. X3, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, an embodiment may be implemented via a scheduling device and/or terminal.

For example, a device may be a BS, a network node, a transmitting terminal, a receiving terminal, a wireless device, a wireless communication device, a vehicle, a vehicle with autonomous driving capabilities, an unmanned aerial vehicle (UAV), an artificial intelligence (AI) module, a robot, an augmented reality (AR) device, a virtual reality (VR) device, or any other device.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to various embodiments may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names.

Various embodiments of the disclosure may be implemented by various means. For example, various embodiments of the disclosure may be implemented in hardware, firmware, software, or a combination thereof.

In a hardware configuration, the methods according to exemplary embodiments of the disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the disclosure may be implemented in the form of a module, a procedure, a function, etc. performing the above-described functions or operations. A software code may be stored in the memory and executed by the processor. The memory is located at the interior or exterior of the processor and may transmit and receive data to and from the processor via various known means.

Those skilled in the art will appreciate that the various embodiments of the disclosure may be carried out in other specific ways than those set forth herein without departing from the spirit and essential characteristics of the various embodiments of the disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the disclosure or included as a new claim by a subsequent amendment after the application is filed.

INDUSTRIAL AVAILABILITY

The various embodiments of disclosure are applicable to various wireless access systems. Examples of the various wireless access systems include a 3GPP system or a 3GPP2 system. Besides these wireless access systems, the various embodiments of the disclosure are applicable to all technical fields in which the wireless access systems find their applications. Moreover, the proposed methods are also applicable to an mmWave communication system using an ultra-high frequency band.

The invention claimed is:

1. A method performed by a user equipment (UE) in a wireless communication system, the method comprising:

receiving a message including assistance data for positioning via long term evolution positioning protocol (LPP); and obtaining the assistance data based on the message, wherein, based on the UE being determined to be a positioning reference unit (PRU) within a specific first time duration in a time domain, a registration message related to registering the UE as the PRU is transmitted via the LPP.

2. The method of claim 1, wherein, based on expiration of the specific first time duration, the UE transmits a de-registration message related to de-registration from the PRU through the LPP.

3. The method of claim 1, wherein the registration message includes information related to a start point of the specific first time duration, a time offset is configured between the start point of the specific first time duration and a time at which the registration message is transmitted, and information about the time offset is provided in the assistance data.

4. The method of claim 1, wherein, based on the UE satisfying at least one of one or more predefined conditions, the UE is determined as the PRU, the one or more predefined conditions include one or more of a first condition related to a position change amount of the UE being less than or equal to a first threshold within a second time duration different from the first time duration, or a second condition related to an average position change amount of the UE being less than or equal to a second threshold within a plurality of third time durations different from the first time duration, lengths of respective time durations provided in the plurality of third time durations are equal to each other, the average position change amount of the UE is an average of the position change amount of the UE within the plurality of third time durations, and the assistance data includes one or more of information about the first threshold or information about the second threshold.

5. The method of claim 4, wherein the position change amount or position change amounts of the UE are obtained based on one or more sensors provided in the UE.

6. The method of claim 1, further comprising:

based on determination that positioning is required for a target UE other than the UE within the specific first time duration, receiving information related to requesting location information of the UE; and transmitting the location information of the UE in response to information related to requesting the location information.

7. A user equipment (UE) operating in a wireless communication system, the UE comprising:

a transceiver; and one or more processors connected to the transceiver, wherein the one or more processors is configured to receive a message including assistance data for positioning via long term evolution positioning protocol (LPP) and obtain the assistance data based on the message, and based on the UE being determined to be a positioning reference unit (PRU) within a specific first time duration in a time domain, a registration message related to registering the UE as the PRU is transmitted via the LPP.

8. The UE of claim 7, wherein, based on expiration of the specific first time duration, the UE transmits a de-registration message related to de-registration from the PRU through the LPP.

9. The UE of claim 7, wherein the registration message includes information related to a start point of the specific first time duration, a time offset is configured between the start point of the specific first time duration and a time at which the registration message is transmitted, and information about the time offset is provided in the assistance data.

10. The UE of claim 7, wherein, based on the UE satisfying at least one of one or more predefined conditions, the UE is determined as the PRU, the one or more predefined conditions include one or more of a first condition related to a position change amount of the UE being less than or equal to a first threshold within a second time duration different from the first time duration, or a second condition related to an average position change amount of the UE being less than or equal to a second threshold within a plurality of third time durations different from the first time duration, lengths of respective time durations provided in the plurality of third time durations are equal to each other, the average position change amount of the UE is an average of the position change amount of the UE within the plurality of third time durations, and the assistance data includes one or more of information about the first threshold or information about the second threshold.

11. The UE of claim 7, wherein the one or more processors are configured to communicate with one or more of a mobile terminal, a network, and an autonomous vehicle other than a vehicle including the UE.

12. A method performed by a device in a wireless communication system, the method comprising:

obtaining assistance data for positioning; and transmitting a message including the assistance data to a user equipment (UE), wherein the message is transmitted via long term evolution positioning protocol (LPP), and based on the UE being determined to be a positioning reference unit (PRU) within a specific first time duration in a time domain, a registration message related to registering the UE as the PRU is transmitted via the LPP.

* * * * *